(12) United States Patent
Bauer et al.

(10) Patent No.: US 8,015,235 B1
(45) Date of Patent: Sep. 6, 2011

(54) GROUP SERVICES

(75) Inventors: Andreas L. Bauer, Boxborough, MA (US); William C. Matthew, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 985 days.

(21) Appl. No.: 11/324,750

(22) Filed: Jan. 3, 2006

(51) Int. Cl.
*G06F 15/16* (2006.01)
*G06F 15/173* (2006.01)
*G06F 13/00* (2006.01)

(52) U.S. Cl. .................. 709/201; 709/226; 711/117
(58) Field of Classification Search .......... 709/201, 709/226; 711/117
See application file for complete search history.

(56) References Cited

U.S. PATENT DOCUMENTS

| | | | | |
|---|---|---|---|---|
| 6,633,538 B1 * | 10/2003 | Tanaka et al. | | 370/222 |
| 6,727,927 B1 * | 4/2004 | Dempski et al. | | 715/853 |
| 6,876,625 B1 * | 4/2005 | McAllister et al. | | 370/221 |
| 7,328,243 B2 * | 2/2008 | Yeager et al. | | 709/205 |
| 7,379,978 B2 * | 5/2008 | Anderson et al. | | 709/219 |
| 2001/0042073 A1 * | 11/2001 | Saether et al. | | 707/203 |
| 2003/0145041 A1 * | 7/2003 | Dunham et al. | | 709/203 |
| 2004/0064568 A1 * | 4/2004 | Arora et al. | | 709/228 |

OTHER PUBLICATIONS

U.S. Appl. No. 09/877,862, Bauer, et al.
U.S. Appl. No. 09/965,430, Krishnan, et al.
U.S. Appl. No. 10/027,694, Nordin, et al.
U.S. Appl. No. 10/172,615, Bauer, et al.
U.S. Appl. No. 10/242,521, Dobberpuhl, et al.
U.S. Appl. No. 11/324,740, Bauer, et al.
U.S. Appl. No. 11/324,751, Bauer, et al.

* cited by examiner

*Primary Examiner* — Ranodhi N Serrao
(74) *Attorney, Agent, or Firm* — Muirhead and Saturnelli, LLC

(57) ABSTRACT

Described is a technique for distributing information about one or more groups of objects in a plurality of nodes. A first portion of group information is stored on each of said plurality of nodes. The first portion includes information about defined groups and associated group hierarchy information. A second portion of the group information is stored on each of the plurality of nodes. The second portion of group information stored on each of said plurality of nodes identifying which objects included in said one or more groups are defined at said each node.

9 Claims, 18 Drawing Sheets

GROUP SERVICES

BACKGROUND

1. Technical Field

This application generally relates to a data storage system, and more particularly to techniques used with reported information about data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Different tasks may be performed in connection with a data storage system. For example, management tasks may be performed in connection with one or more data storage systems. A management console or station may be used to monitor the data storage systems. The management console may be provided with updates or changes regarding the data storage systems. The information may be provided, for example, in response to a request or query issued from the management console.

One existing technique utilizes a database including all the information for the data storage systems. Data regarding the status, usage, and the like, about the data storage systems may be collected and stored in the database. When a request for information about the data storage systems is made from the management console, the database may be accordingly queried. One drawback of the foregoing is that a customer using the data storage systems has to configure, purchase, and otherwise maintain the database in order to manage the underlying data storage systems. Depending on the particular system, the foregoing drawback may prohibit use of the database in low-end and mid-range environments. Another drawback with the foregoing technique is that there is a single point at which all data is collected and through which all database requests are made. This may create a bottleneck in connection with a large amount of incoming reported data being collected and/or the processing associated with retrieving any such collected information for system management. The use of a single central database and associated server may not be scaleable in that there may not be sufficient network bandwidth or computer processing capabilities available as the number of data storage systems and/or devices therein increases. For example, the number of incoming messages reporting device information increases with the number of data storage systems and may eventually saturate or "flood" the database, server, and associated network used for reporting. Additionally, as the amount of information reported increases, more time is needed to process the reported information. Accordingly, more time may elapse before the management console receives the updated information. As a result, the total time which elapses between the occurrence of reported information until that reported information is eventually received by a system manager at the management console may not be an acceptable amount of time. The management console may be displaying, for example, stale or outdated information or may otherwise receive requested information with unacceptable time delay. An additional problem is how to present the reported information to a user at a management console in a useful form.

Thus, it may be desirable to have an efficient technique for collecting information regarding one or more data storage systems. It may be desirable that the technique be scalable for use with a varying number of data storage system and devices. It may also be desirable to utilize techniques in connection with making reported information available in a useful form.

SUMMARY OF THE INVENTION

In accordance with one aspect of the invention is a method of distributing information about one or more groups of objects in a plurality of nodes comprising: storing a first portion of group information on each of said plurality of nodes, said first portion including information about defined groups and associated group hierarchy information; and storing a second portion of group information on each of said plurality of nodes, said second portion stored on each of said plurality of nodes identifying which objects included in said one or more groups are defined at said each node. A same first portion may be stored on each of said plurality of nodes and wherein said second portion may be stored at each of said plurality of nodes varies in accordance with objects defined at said each node. Each of the objects may correspond to a logical entity or a physical entity on one of the plurality of nodes. The one or more groups may include at least one group with objects from different nodes. The plurality of nodes may correspond to a domain of data storage systems. The first portion may include names of defined groups and which groups are included as members of other groups.

In accordance with another aspect of the invention is a method of processing requests for group information about one or more groups of objects in a plurality of nodes comprising: receiving a request at a first node for group information; determining whether said first node is able to service said request using group information of said first node, said group information of said first node including a global portion of group information stored on each of said plurality of nodes and a local portion of group information identifying which objects included in said one or more groups are defined at said first node; if said request can be serviced using said group information at said first node, returning a response in accordance with said request; if said request cannot be serviced using said group information at said first node, said first node requesting others of said plurality of nodes to use local portions of said plurality of nodes to determine return information in accordance with said request; communicating, by each of said other nodes, said return information to said first node; and performing processing by said first node to produce final information in accordance with said return information from each of said other nodes and from group information of said first node. The request may be forwarded by said first node to others of said plurality of nodes in accordance with a dynamic communication tree, said first node being a root of said dynamic communication tree. The request may be forwarded by each node in the dynamic communication tree to child nodes of said each node, and said each node consolidates return information received from its child nodes, said return information received at said each node representing information about descendant nodes of said each node in accordance with said request. Each node may return to its parent node received information about its descendant nodes and group information about said each node. Each node may include a group service which identifies which objects in said plurality of groups are defined at said each node, and said each node uses its group service in connection with processing said request. Each group service may include support for servicing a request for determining all groups that exist, said servicing being performed using only said global portion of group information. Each group service may include support for servicing a request for determining all groups that are included within a specific group, said servicing being performed using only said global portion of group information. Each group service may include support for servicing a request for identifying which objects are defined at said each node for a specific group, said servicing using only group information stored at said each node. Each group service may include support for servicing a request for identifying which groups a named object is a member. Each group service may include support for performing a request local or globally in accordance with an indicator of said request, if said indicator indicates a local inquiry for said request, performing processing at said each node to service said request with respect to only said each node, and if said indicator indicates a global inquiry for said request, performing processing at said each node to service said request with respect to said each node and other descendant nodes in accordance with said dynamic communication tree.

In accordance with another aspect of the invention is a computer program product for distributing information about one or more groups of objects in a plurality of nodes comprising code that: stores a first portion of group information on each of said plurality of nodes, said first portion including information about defined groups and associated group hierarchy information; and stores a second portion of group information on each of said plurality of nodes, said second portion stored on each of said plurality of nodes identifying which objects included in said one or more groups are defined at said each node. A same first portion may be stored on each of said plurality of nodes and wherein said second portion may be stored at each of said plurality of nodes varies in accordance with objects defined at said each node. Each of the objects may correspond to a logical entity or a physical entity on one of the plurality of nodes. The one or more groups may include at least one group with objects from different nodes.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
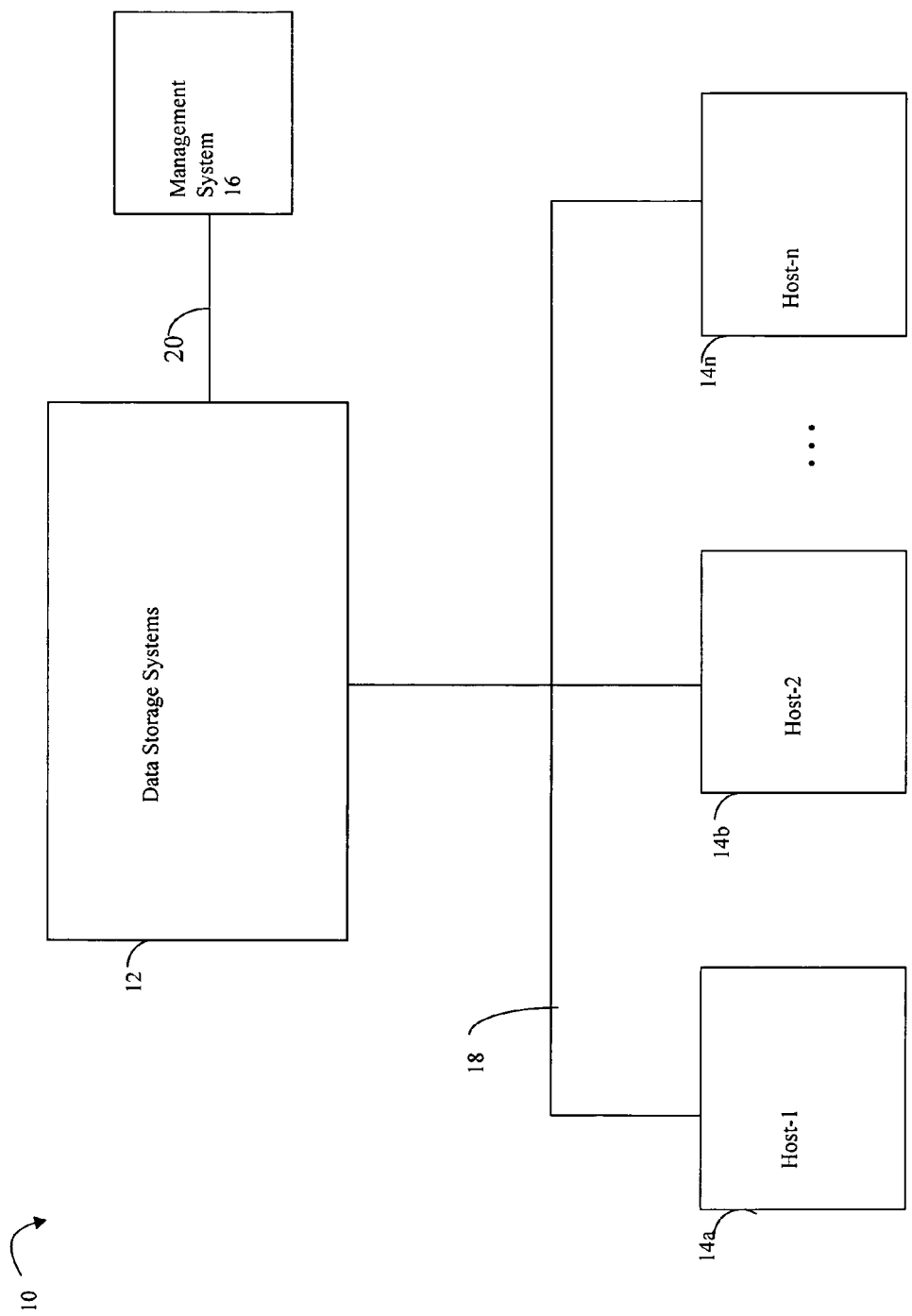
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

As will be described in more detail herein, the management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. Techniques that may be used in connection with data storage system management are described in more detail elsewhere herein.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
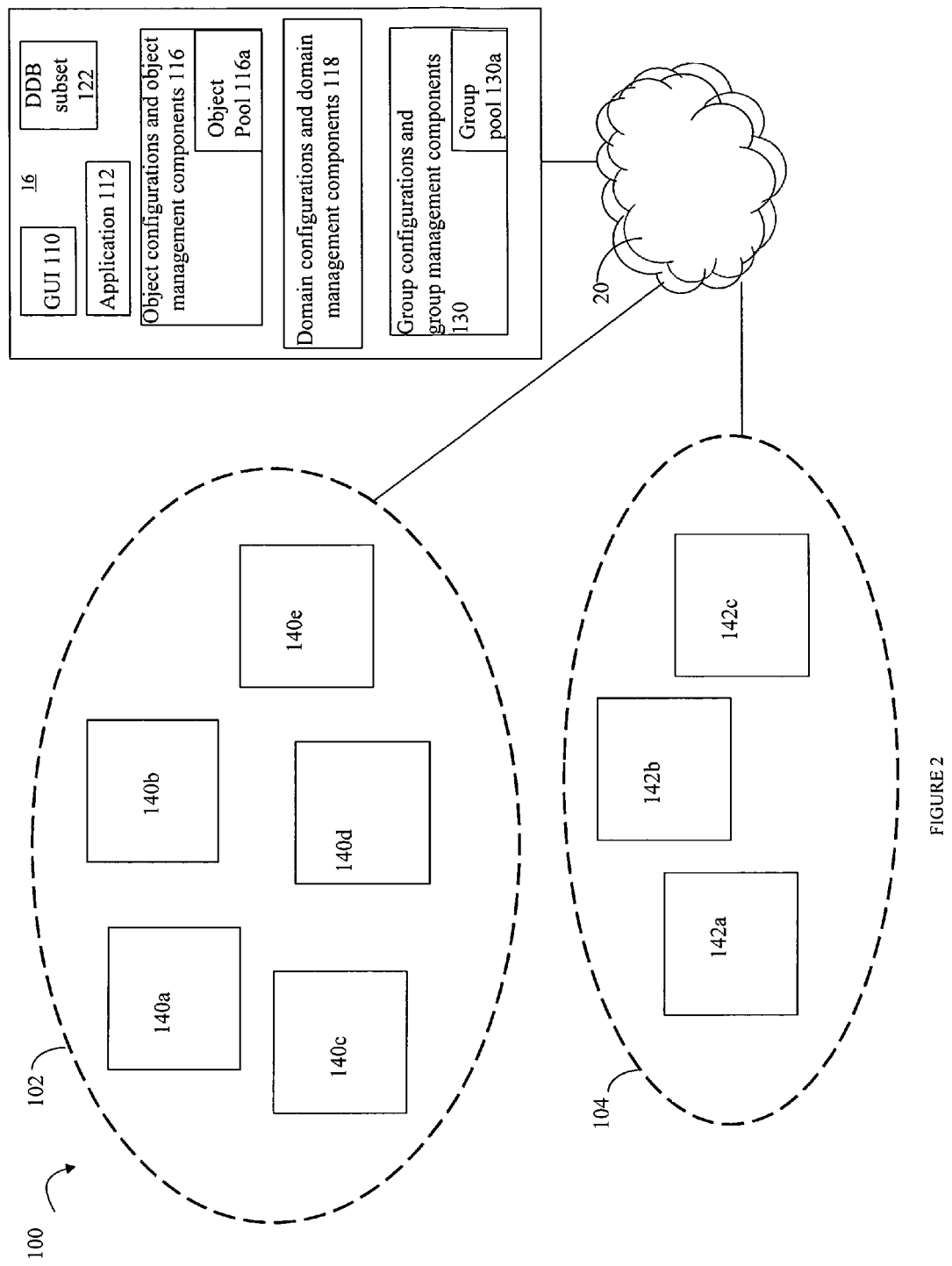
FIG. 2 is an example of an embodiment of components of FIG. 1 in more detail as may be used in connection with techniques described herein.

Referring now to FIG. 2, shown is an example 100 of components that may be used in connection with techniques described herein. Included in the example 100 are domains 102 and 104, components that may be included in the management system 16, and communication connection 20. A domain may be defined as a functionally bounded set of interconnected components, such as data storage systems, that communicate and/or cooperate for a common purpose. The particular data storage systems included in a domain may be user-configured. In connection with the techniques described herein, a user may want to perform operations for data storage system management at the domain level (e.g., for the data storage systems included in a domain). Thus, a user may accordingly configure one or more domains. In this example, two domains 102 and 104 are specified although an embodiment may include a varying number of one or more domains. Each of the domains 102 and 104 may be configured to include one or more data storage systems. The domain 102 includes data storage systems 140a-140e. The domain 104 includes data storage system 142a-142c. It should be noted that in one embodiment, the same storage system may not belong to more than a single domain at any particular time.

The components of the management system 16 may include a graphical user interface (GUI) 110, one or more applications 112, object configurations and object management components 116, domain configurations and domain management components 118, a directory database (DDB) subset 122, and group configurations and group management components 130.

The GUI 110 may be used in connection with interfacing with a user, such as a data storage system manager. The GUI 110 may be used to obtain input in connection with inquiries to be made regarding one or more domains. The GUI 110 may also be used in connection with displaying output, for example, in response to obtaining information for requested inquiries regarding the one or more domains. The GUI 110 may be used in connection with one or more applications 112 for performing system management of the data storage systems included in domains 102 and 104.

The domain configuration and domain management components 118 may be used in connection with storing information about what nodes are included in each configured domain. If changes are made to a domain configuration such as, for example, in connection with the addition and/or removal of a data storage system, domain management components may accordingly update the configuration of the affected domain(s). One embodiment of a domain and supporting components as may be included in the management system 16 is described in more detail in U.S. patent application Ser. No. 10/242,521, entitled "ROBUST INDICATION PROCESSING FAILURE MODE HANDLING", filed on Sep. 12, 2002, assigned to EMC Corporation, which is incorporated by reference herein. It should be noted that the foregoing embodiment includes components and describes processing as may be included in a system specifying a failover processor for a data storage system. In the foregoing application incorporated by reference, each data storage system includes multiple processors forming a cluster. Only one of the processors is designated as active at any time. Techniques are further described in connection with maintaining communication with a designated active one of the cluster's processors and designating another of the cluster's processors in the event an active processor fails or is otherwise not available for use. It will be appreciated by those skilled in the art that the distributed information roll-up and other techniques described herein may also be used in connection with an embodiment that does not include the foregoing failover functionality and/or does not utilize a node having multiple processors.

The object configurations and object management components 116 may be used in connection with management of objects associated with the data storage systems of domains 102 and 104. As described herein, an object may refer to an entity commonly used in connection with object oriented programming. An embodiment of an object may be defined as a data container including data and/or instructions to be used in connection with accessing a particular object. In connection with the techniques described herein, an object may be associated with an entity in a domain for monitoring or observing a component such as in connection with the management of data storage systems. An object may represent a real-world entity such as a hardware or software entity. Examples of such hardware or software entities may be, for example, an application executing on a server, a LUN, disk, port, fan, and the like. The entity may be a physically or a logically defined entity as may be included in a node of the domain.

The element 116 may include an object pool 116*a* representing a subset of all objects that may be defined for a given system, such as illustrated herein. The contents of the object pool may vary in accordance with the particular operations being performed by the GUI 110. Information about each of the objects may be stored on each node for which the object is defined. In other words, each node includes information about its own objects. The particular subset of objects included in the object pool may vary in accordance with the operation performed via the GUI since the object pool is used in facilitating GUI operations. For example, if the user is performing an operation to view objects defined for a first data storage system, the object pool may include that subset of objects defined for the first data storage system. If the user subsequently views objects defined for a second different data storage system, the object pool may be updated to include a different subset of objects defined for the second data storage system.

The element 116 may represent collectively the components for maintaining and management of the object pool 116*a*. The object management components included in 116 may handle management of the foregoing object pool including, for example, retrieving updated information about which objects are defined for a node at the time of a user selection.

The components in 116 may retrieve such information and maintain the lists of objects defined for each node using any one or more different techniques. In one embodiment, an inquiry may be sent to each node requesting a list of all objects when needed such as, for example, when the user is defining groups and requests a list of objects defined for a particular node.

Group configurations and group management components 130 may be used in connection with defined groups of objects. In one embodiment, groups may include user-configured groups. A user, such as a data storage system manager, may associate one or more objects with a particular group. During operation of a system, the user may also update or reconfigure the defined groups. In connection with the GUI, a group may be displayed as, for example, a folder. Objects included in a group may span one or more physical data storage systems included in a domain. For example, a group may be defined for all LUNs. A group may also be defined for a subset of a particular resource, such as a portion of devices or volumes including critical data as may be used by a particular application or for a specific business function or purpose. A group may also include objects associated with different types of resources. For example, a group may be defined to include all objects associated with a particular data storage system. The objects may include all ports, LUNS, applications, and the like.

The group may be defined to recursively include a subset of objects within a domain. In one embodiment, a group may also be defined to include other groups. In other words, an element of a first group may be a second group or an object. The particular objects included in the first group may be defined by repeatedly determining all the objects in each nested group, such as the second group. It should be noted that an embodiment may allow for a group nesting of a predetermined depth or number of levels. The value may be user configurable in an embodiment.

The element 130 may include a group pool 130*a* representing a subset of all possible group information for all groups defined in a given system such as 10. As with the particular subset of objects included in the foregoing object pool, the particular subset of group information included in 130*a* varies in accordance with the particular operation performed by the GUI 110. Element 130 may also collectively represent components used in connection with management and maintenance of the group pool 130*a*.

In one embodiment, a user may select which objects on a particular data storage systems are included in a particular group. Group definitions may be made, for example, using the GUI 110 by repeatedly selecting from displayed objects defined for different nodes. Tables or lists of objects defined for each node as used by the GUI may be stored in the object pool 116*a* during the foregoing displaying and selecting process for defining a group.

The DDB subset 122, as included in the management system 16, may be used in connection with facilitating communication between elements in the domain in connection with techniques described herein. The DDB subset 122 may be a subset of the entire persistent DDB as may be stored on each node of the domains. As illustrated in connection with other figures herein, the DDB may be distributed throughout the entire network and included in each node of the domain. The DDB may be characterized as a generic directory of persistently stored data which is maintained and recoverable, for example, in the event of a power failure. Each node included in the domain may have an address or associated entry in the DDB. A first node wishing to communicate with another node in the domain may obtain the address layout or other information in order to communicate with the other node from the DDB. The DDB may be viewed as a database of address listings for entities in an embodiment. The particular entities listed may vary with each embodiment but may include address information for all nodes in a domain. Addresses may also be included in the DDB for other entities as may be included and used in an embodiment. In one embodiment, all nodes may mount a shared drive accessing a file or other data container including a common set of directory information as may be held in a single central location. Another embodiment of the DDB is described in U.S. patent application Ser. No. 09/965,430, filed Sep. 27, 2001, entitled "MANAGING A DISTRIBUTED DATABASE CACHE", which is incorporated by reference herein. As will be appreciated by those skilled in the art, other embodiments of a DDB may be used in connection with the techniques described herein. The DDB may be used in facilitating gathering of information using the distributed information roll-up techniques described in more detail in following paragraphs.

The particular subset of the DDB 122 included in 16 may vary in accordance with the particular operations performed by the GUI 110 since the element 122, along with 116*a* and 130*a*, may be used to facilitate GUI operations.

The data storage systems included in the domains 102 and 104 may be, for example, data storage systems as manufactured by a single vendor such as EMC Corporation. An embodiment may also include data storage systems from multiple vendors. These, and other particulars described herein for the purposes of example and illustration should not be construed as a limitation of the techniques. The data storage systems included in the domains 102 and 104 and the management system 16 may communicate through the communication connection 20. In this example, the connection 20 may be a network connection although other types of connections may be used. The particular type of communication paths may vary in accordance with each embodiment. For example, the communication path used in connection with data storage management may also include a switching fabric. The types of connections used for data storage system management and/or I/O may include, for example, a fibre channel, SCSI, iSCSI or other communication connection.

It should be noted that the particular one or more components that may be included in the management system 16 may vary with each particular embodiment. As described elsewhere herein, the management system 16 may include, for example, a computer system which has a processor and a display device. The processor may execute instructions to display information about the storage system to a storage system manager. Software executing on the computer system of the management system 16 may also be used in connection with obtaining user input, such as may be obtained from the data storage system manager in connection with monitoring data storage systems.

The number and type of components included in management system 16 may vary with the complexity of the storage system as well as the particular applications and tasks performed in an embodiment. For example, management system 16 may include only a single computer system or processor with a single display device. Alternatively, an embodiment may require greater complexity in connection with management of the data storage system. Thus, the management system 16 may also include additional software and/or hardware It should be noted that in the embodiment described herein, no data used in connection with the techniques described herein is stored persistently on the management system. Rather, such information may be stored persistently on the nodes.

Techniques will now be described in connection with data storage system management as may be used in connection with one or more data storage systems in an embodiment of the computer system 10 of FIG. 1.

A user may manipulate, monitor and view data regarding groups of objects for a particular domain in connection with the techniques described herein for distributed information roll-up. Using the techniques described herein, each node in a domain rolls up a partial view of requested information for objects of a particular group or groups included in, or defined on, that node. For each domain, a node may be designated as a central collector which communicates with the GUI in connection with processing a request. In this embodiment, this may be a request to gather information on one or more nodes in a domain in connection with management thereof. The central collector may be a node, such as a data storage system, included in the domain. In one embodiment, the central collector asks other nodes in the domain to determine partial views for objects included in one or more groups. These partial views are then reported back to the central collector for consolidation into a single report which is then communicated to the requestor, such as the GUI 110 in connection with a user request for information about objects in one or more groups. For example, a request may be made to provide the average throughout of I/Os associated with objects in a group. The central collector node receives the request and determines its partial view. The central collector determines the throughput of I/Os for objects in the particular group as included in the central collector. Additionally, the central collector node forwards the request on to other nodes to similarly determine their partial views of objects in the group. In other words, each of the other nodes also determines the throughput of I/Os for objects in the particular group as included in, or defined on, each node. The information is returned to the central collector which then consolidates the received information. The central collector may also perform any additional computation needed. For example, with reference to the average throughput of I/Os, an average is desired. If all received information is the throughput of I/O's, the central collector takes the average of this. The central collector may receive as return information about each other node, for example, the total number of I/Os and the associated total number of objects. Using the foregoing information, the central collector may take the average and return this to the GUI. The central collector may dynamically make this request of all other nodes in the domain to determine and return the requested information.

The central collector may be selected, for example, by a user. An embodiment may also use other techniques in connection with selection of a central collector. Such techniques may include, for example, an executing process making a selection based on one or more heuristics.

In one embodiment, the central collector may utilize a technique referred to as request forwarding in connection with the distributed information roll-up techniques described herein. Request forwarding is described in detail in U.S. patent application Ser. No. 09/877,862, filed on Jun. 8, 2001, entitled SCALABLE COMMUNICATION WITHIN A DISTRIBUTED SYSTEM USING DYNAMIC COMMUNICATION TREES, which is incorporated by reference herein. Request forwarding utilizes a tree structure of the nodes in a domain in which the root of the tree may be the central collector. The central collector forwards the request down the tree toward the leaf nodes by instructing each node in the next level to similarly determine and report its own local view of objects in the requested group. If a node has nothing to add regarding the request (e.g., the node has nothing about the objects referenced in the request), the node may act as a conduit and further forward the request down to other nodes and similarly return information back up through its parent to the node originating the request. The central collector also requests each node in the next level to collect information from any of its child nodes and form a consolidated report of any collected information along with its own local view. This process of request forwarding is continued until the leaf nodes are reached. At this point, the leaf nodes determine their local views and report this information back up the tree to their respective parent node. The parent nodes collect the reported information from all their respective children (which includes information for all descendants of the child nodes) and form a consolidated report of this information and any local information from the parent node. The parent node then returns this consolidated information to its parent, and so on. The information is reported up the tree until the root node is reached. The tree is dynamic in that it may be determined at the time the information is being gathered. In response to a second request at a later time for the same information, a different tree may be determined.

Using the foregoing request forwarding, each node in the domain has connectivity to each other node in the domain. The respective addresses of nodes in the domain may be included and maintained in the DDB as illustrated in various figures herein. One embodiment for managing the DDB is described in more detail in U.S. patent application Ser. No. 09/965,430, filed on Sep. 27, 2001, entitled MANAGING A DISTRIBUTED DIRECTORY DATABASE, which is incorporated by reference herein.

In an embodiment in which each node in the domain has connectivity to every other node in the domain, any one of the nodes may be selected as the central collector node. In an embodiment, selection of the central collector node selection may be in accordance with the capabilities specific to each node. For instance, if one node is a low-end system with limited processing power, it may not have sufficient resource to function as a collector node.

In an embodiment in which the nodes in the domain do not have connectivity to other nodes, an alternate technique may be used. The central collector node selected may have connectivity to each of the other nodes in the domain individually but the other nodes in the domain may not have connectivity to each other. In this instance, the central collector node may collect or gather the partial views of each other node in the domain. In one aspect, a tree of level 1 is used in which the collector is the root node and communicates directly with all the nodes in the domain as leaf nodes.

It should be noted that the central collector node may be a data storage system or it may be another computer system such as a personal computer. The data storage systems used in connection with the embodiment described herein include one or more processors that are used in executing code to perform the reporting and other processing described herein in accordance with the distributed roll-up techniques.

It should be noted that the groups of objects can be defined for any particular criteria. Some examples are given herein. Other examples may include groupings based on hardware characteristics, such as all disks meeting certain criteria, all LUNs, and the like. Queries or inquiries made with respect to the groups can be, for example, performance based to facilitate data storage system management.

Figure 3:
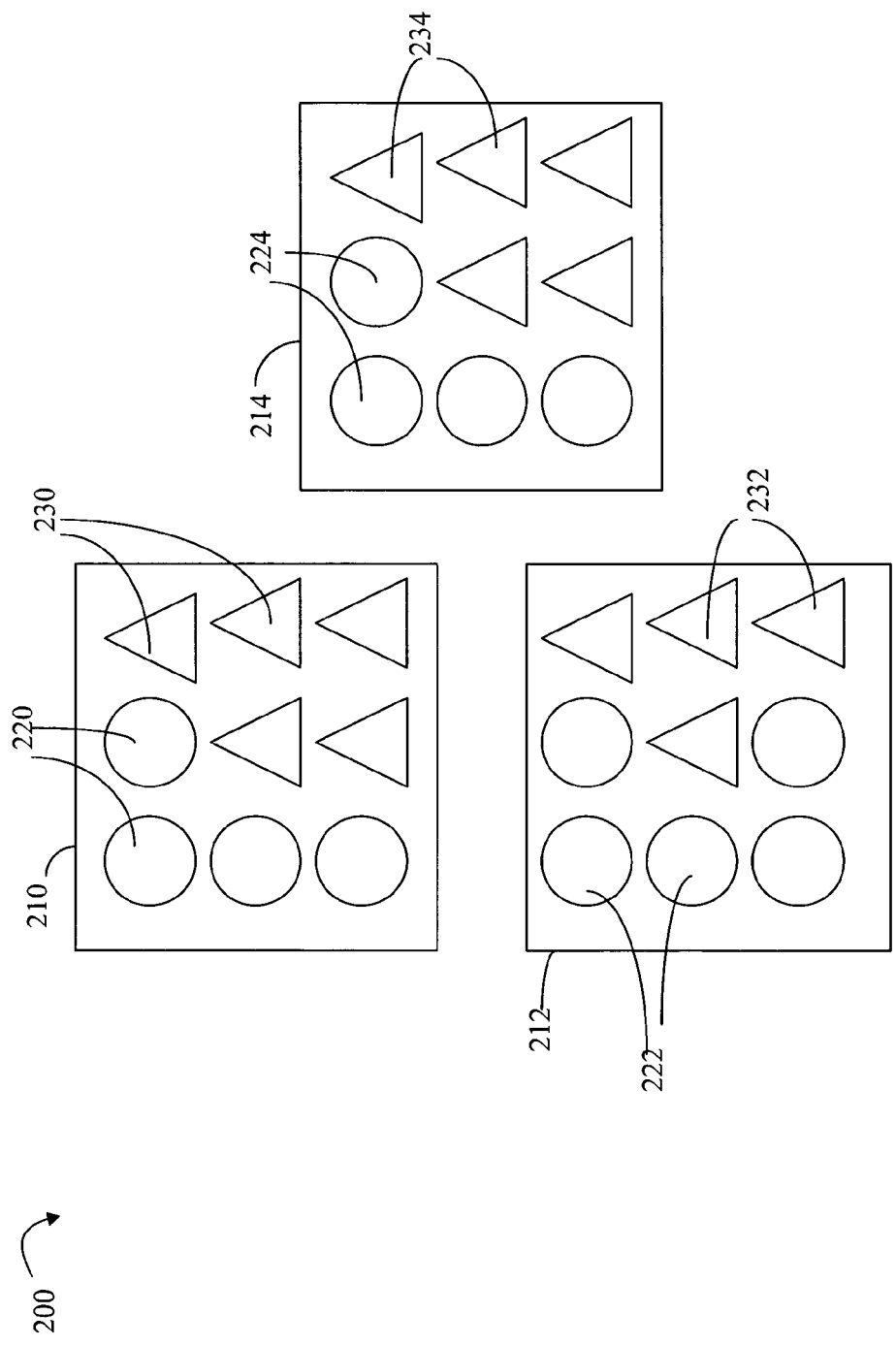
FIG. 3 is an example illustrating group of objects as may be associated with multiple nodes in a domain.

Referring now to FIG. 3, shown is an example representation of objects that may be defined in one or more nodes in a domain. In this example, nodes 210, 212 and 214 are included in a domain. Two groups of objects are defined. A first group of objects included in the nodes is illustrated by the various circles such as 220, 222, and 224. A second group of objects included in the nodes is illustrated by the various triangles such as 230, 232, and 234. If a request is made to report information about the first group, each of the nodes 210, 212 and 214 reports on objects represented by the circles defined locally for each node. In other words, node 210 reports on all circles included in 210, and similarly, nodes 212 and 214 respectively report on the requested objects represented by the circles. If a request is made to report information about the second group, each of the nodes node 210, 212 and 214 reports on objects represented by the triangles defined locally for each node. If the request forwarding technique is utilized and node 210 is defined as the central collector node with nodes 212 as child node of node 210, and node 214 as the child node of 214, then node 214 reports its information to parent node 212. Parent node 212 consolidates the information from 214 with its information and reports this to node 210. If request forwarding is not used and the central collector node 210 has connectivity to nodes 212 and 214, then nodes 212 and 214 may report their information to node 210.

Figure 4A:
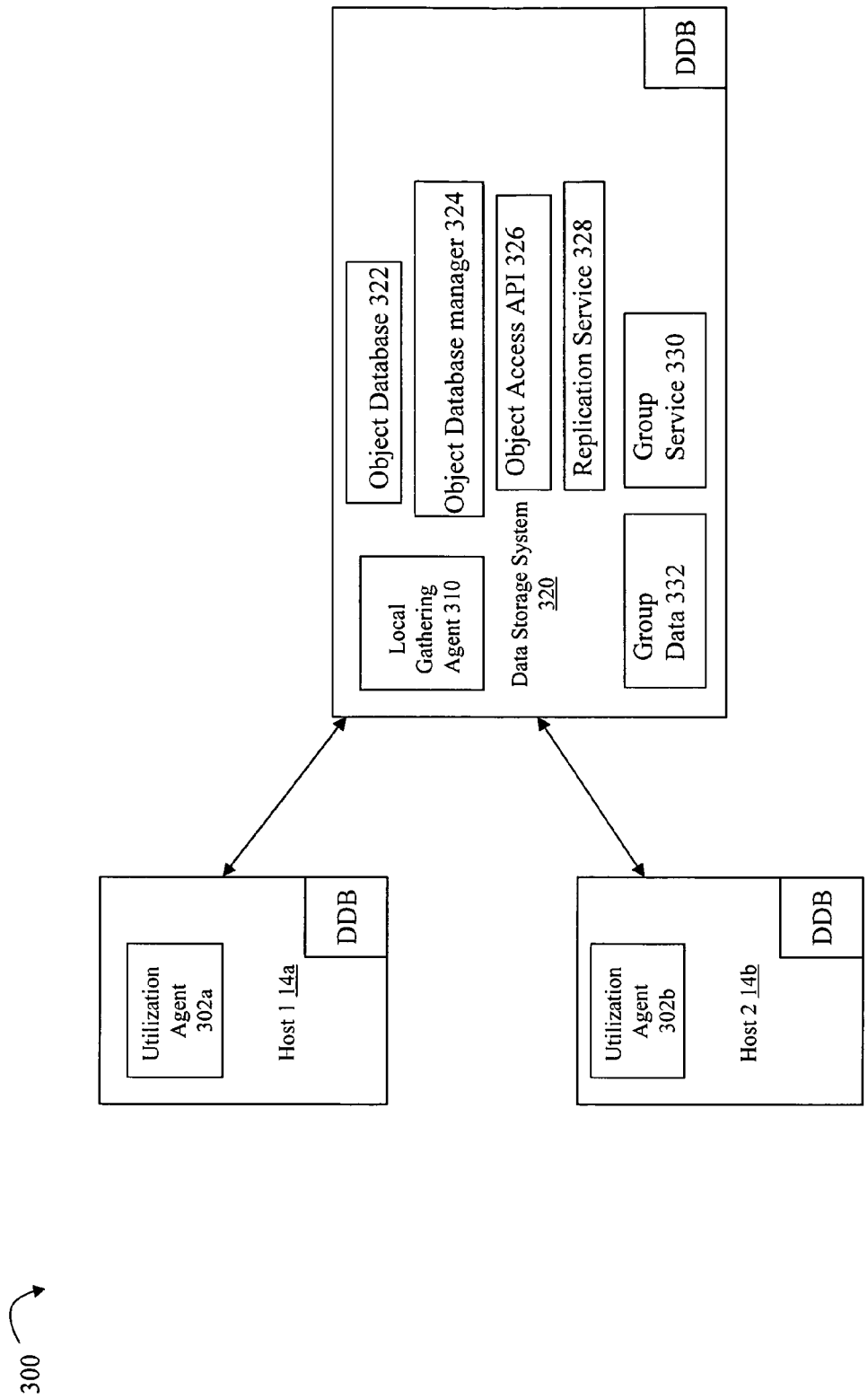
FIG. 4A is an example of components that may be included in a node and associated host used in connection with the techniques described herein.

Referring now to FIG. 4A, shown is an example of components that may be included in an embodiment of a node which is a data storage system and its associated hosts or servers for use in connection with the techniques described herein. In the example 300, the data storage system 320 may be a node in a domain as illustrated, for example, in FIGS. 2 and 3. Also illustrated are two hosts 14a and 14b which may utilize resources having corresponding objects defined in the data storage system 320. The data storage system 320 includes a local gathering agent 310 which performs processing in connection with gathering requested information (e.g., metrics, properties, and the like) about objects defined in the data storage system 320. The data storage system 320 also includes an object database 322, an object database manager 324, a group service 330, group data 332, an object access API (Application Programming Interface), 328, and a replication service 328.

The object database 322 may be a database of objects defined for the data storage system 320 and associated current information or properties about each object. The properties may include, for example, status of an associated object, various metrics such as throughput, total capacity, and used/unused capacity (e.g., for a physical device or logical volume), and the like, about an object. The particular properties may vary with each object and embodiment. The object database manager 324 may handle management of object information including, for example, retrieving updated information about an object at specified time intervals. Each of the hosts 14a and 14b may include a utilization agent 302a and 302b which reports how an object from the data storage system 320 is used by the respective hosts. The utilization agents 302a and 302b report such information regarding usage to the local gathering agent 310. Any one of a variety of different techniques may be used in connection with the utilization agents reporting to the local gathering agent 310. For example, each utilization agent may report on information only when requested, may report on selected information automatically at predetermined time intervals, or some other technique, or combination of one or more of the foregoing. The object database manager 324 may, for example, perform local polling of all objects to refresh the object database 322. Polling may be performed, for example, every minute or some other designated time interval that may vary with each embodiment.

An object access API 326 may be used in connection with handling requests, such as from other nodes or the GUI 110, for information about properties of one or more objects. The objects for which properties are requested may also be specified using groups. In other words, an embodiment may include as a parameter to the object access API 326 a group designation for specifying a group of one or more objects. An embodiment of the API 326 may also allow an input parameter to include one or more object designations. An embodiment of the API 326 may provide support for three different types of inquiries or requests for information causing the API 326 to perform processing in one of three different modes in accordance with the indicated scope:

1. local only—The node returns information only with respect to the objects defined at the local node as may be included in the node's object database.

2. global with request forwarding—The local node returns information with respect to locally defined objects as well as rolling up information from other descendant nodes using the request forwarding techniques described elsewhere herein. In connection with this mode, the request may include tailored request forwarding information specifying the other nodes for which the current node is to perform information consolidation. For example, if the dynamic communication tree determined using the request forwarding techniques indicates that the current node is the root of a subtree, then the current node obtains information from all nodes in this subtree. The request received includes forwarding information tailored in accordance with this subtree of nodes. As an example, if the current node is the root of a subtree with three leaf nodes at a next level of the tree, the request forwarding information is tailored to indicate that the current node is to forward the request for information to each of its leaf nodes and then stop. As another example, if the current node is the root of a subtree having two additional levels, the request forwarding information is also accordingly tailored to request and obtain the requested information from all descendants in the subtree.

3. subset of nodes—The local node directly forwards the request and obtains information from each of the subset of nodes using information from the node's own DDB.

It should be noted that the particular functionality and parameters utilized in connection with the object access API 326 may vary with each embodiment.

The object access API 326 may communicate with other components at the same node as well as other components of other nodes when handling or servicing a received request. In connection with obtaining information about the local node which received the request, the API 326 may communicate with the object database manager 324. In connection with obtaining information about other nodes as in connection with the second mode above (e.g., global with request forwarding), the API 326 may communicate with other instances of the API 326 on other nodes and the request sent to the other nodes may indicate a request of the appropriate type. For example, if the current node is obtaining information from other nodes which are indicated as leaf nodes, the current node may send requests to the other nodes indicating that each node return information in accordance with the above-referenced first mode (e.g., local only). If the first of the other nodes is not a leaf node and is to further request information from additional nodes, the request sent by the current node to the first node includes the appropriate request forwarding information and indicates that the first node is to operate in accordance with the second mode above (e.g., global with request forwarding).

A request received by the API 326 may also indicate whether a refresh of the object database 322 is to be performed prior to servicing the request. Such a refresh may be requested, for example, in the event that there is an intolerance for data which may have an age in accordance with the object database refresh time interval. It should be noted that if a node includes no information about a requested one or more objects, the node's API 326 may return a message indicating the foregoing. Information, such as metrics about an object or a group of objects, as may be reported by a node's object access API 326 is with respect to those objects defined at the node.

The object database manager 324 may communicate with the local gathering agent 310 in order to obtain information about an object. The local gathering agent 310 may, for example, interact with other components, such as system services, in order to obtain information about one or more objects. The agent 310 may also communicate with utilization agent 302*a* on a host as needed in accordance with the particular information requested and the object. The utilization agent 302*a* may report on particular object properties regarding host usage of resources associated with objects of the local node.

The group service 330 may be used in connection with determining group definitions, group membership and group hierarchies. The group service is used in connection with maintaining, accessing and managing the group data 332. The group data 332 included on each node varies from node to node. The group data 332 may include a global portion and a local portion. The global portion is replicated on all other nodes and includes information about what groups are defined (e.g., a list of group) and the group hierarchy (e.g., what nested groupings or "groups of groups" are defined). The local portion varies from node to node and includes information about what objects from the local node are included in what groups. In other words, each node only has knowledge about which of its own objects are included in each group. The local portion provides for partitioning or distributing the group data regarding object membership of each group among all nodes contributing objects to the group. In order to obtain a complete list of all objects in a group, all nodes may be queried and return their own locally defined objects included in the group. The techniques used in connection with a group service 330 obtaining group information from other nodes is described in more detail elsewhere herein.

The replication service 328 may be used in connection with replication of the global portion of the group data on all nodes in the domain. It will be appreciated by those skilled in the art that any one of a variety of different techniques may be used in connection with data replication of the global portion of the group data on all nodes in a domain. One such technique is described in U.S. patent application Ser. No. 10/027,694, filed Dec. 20, 2001, entitled "DATA REPLICATION FACILITY FOR DISTRIBUTED COMPUTING ENVIRONMENTS", which is incorporated by reference herein.

It should be noted that although a node is illustrated herein as being a data storage system, the techniques used herein may be applied to other entities having connectivity with respect to nodes in a domain. A node is illustrated herein as a data storage system. However, a node used in connection with the techniques described herein may be any entity having connectivity with respect to other nodes in a domain and having the appropriate components as illustrated in connection with FIG. 4A. For example, a node may be a host or server, a network device, and the like, connected to other nodes in the domain and also having the components used in connection with the object data and group data. Examples of these components as may be included in an embodiment of a node are illustrated in the data storage system 320 of FIG. 4A. It should also be noted that a node may use other components, such as the utilization agent 302*b*, which may be executed or reside elsewhere (e.g., other than the node) and may be used in connection with objects defined locally at the node.

A more detailed example illustrating the distribution of group data regarding group membership and definitions will now be described in connection with FIGS. 4B, 4C and 4D.

Figure 4B:
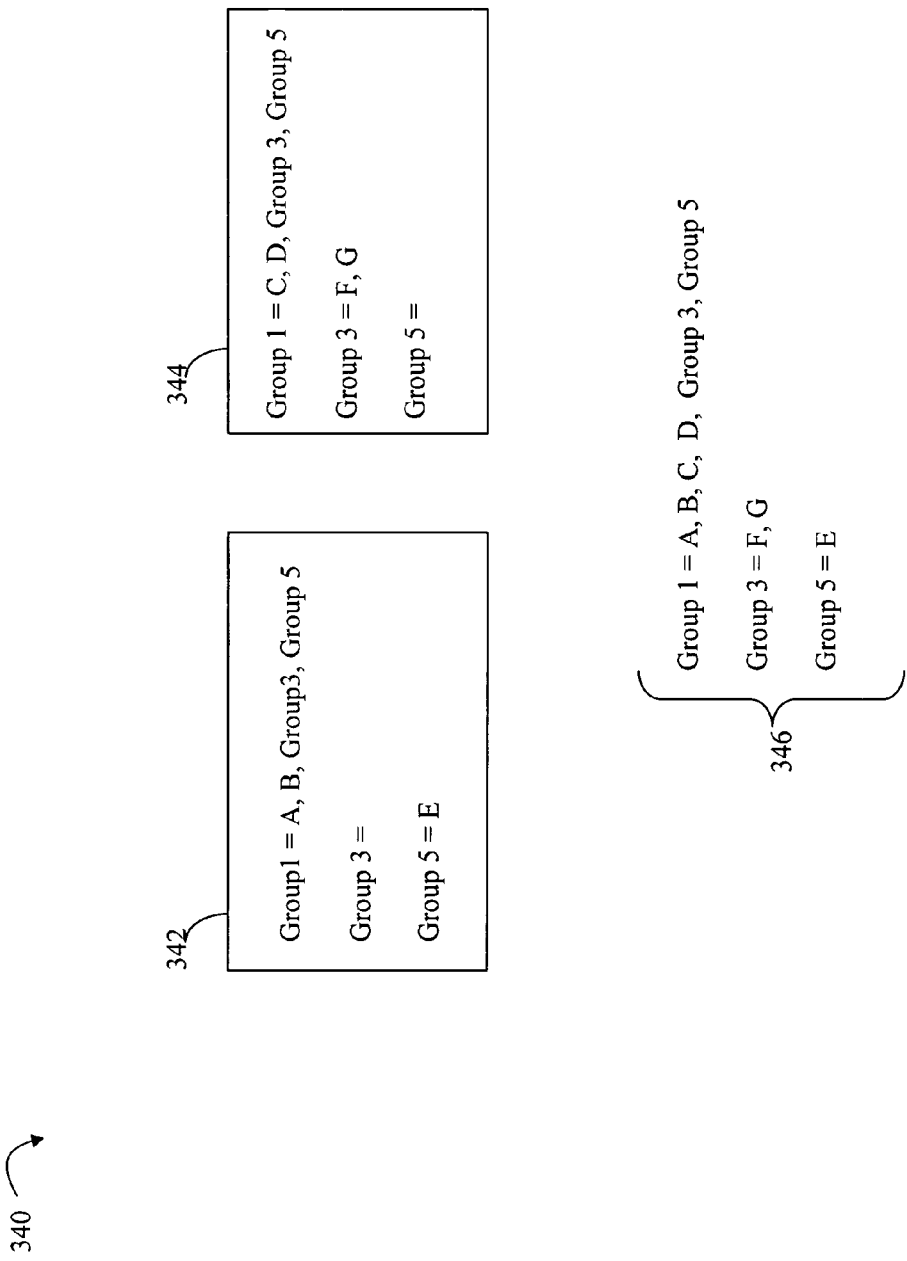
FIGS. 4B, 4C and 4D illustrate examples of how group data may be stored in a distributed fashion on nodes of a domain.

Referring now to FIG. 4B, shown is an example 340 of group data regarding group membership and definitions as may be distributed among nodes in a domain. In this example, element 346 represents the collective and complete view of group membership data. All members included in element 346 are distributed in nodes 342 and 344 as illustrated in 340. The node 342 stores in its group data container that objects A and B are members of Group 1 since A and B are objects defined in node 342. Node 342 also stores in its group data container that object E is a member of Group 5 since E is defined in node 342. Node 344 stores in its group data container that objects C and D are members of Group 1 and objects F and G are members of Group 3 since the foregoing objects C, D, F, and G are defined in node 344. Both nodes include information about what named groups (e.g., Group 1, Group 3 and Group 5) and the defined group hierarchy (e.g., Group 3 and Group 5 are nested or included at a single level within Group 1). FIG. 4B represents the group data as stored at each of the nodes 342 and 344 for the complete set of group data as included in 346.

Figure 4C:
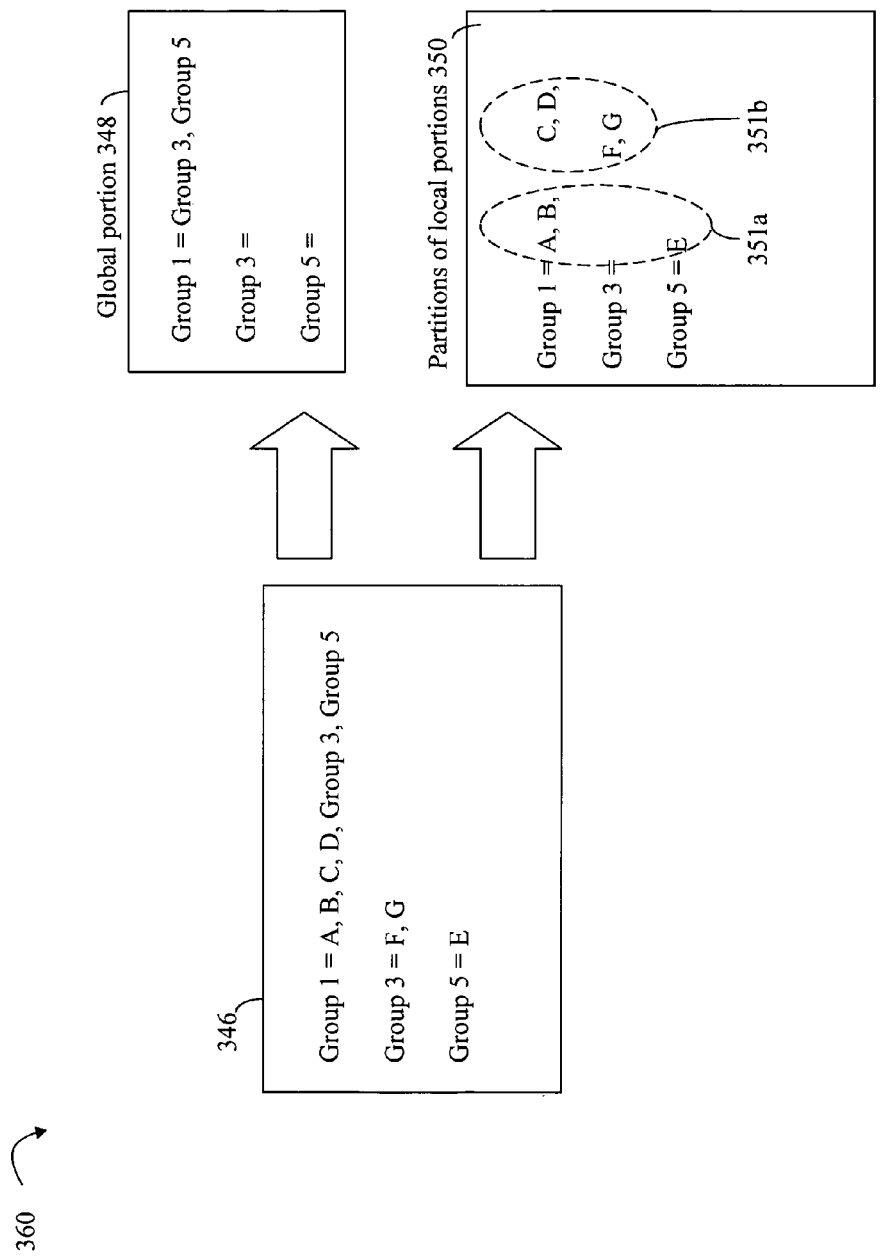

Referring now to FIG. 4C, shown is an example 360 illustrating another representation of the complete set of group data of element 346. Example 360 illustrates how the group data of 346 my be divided into a single global portion 348 and one or more local portions 350. Each node stores the global portion 348 and its own local portion. With reference to nodes 342 and 344 of FIG. 4B, node 342 stores local portion 351a and node 344 stored local portion 351b.

Figure 4D:
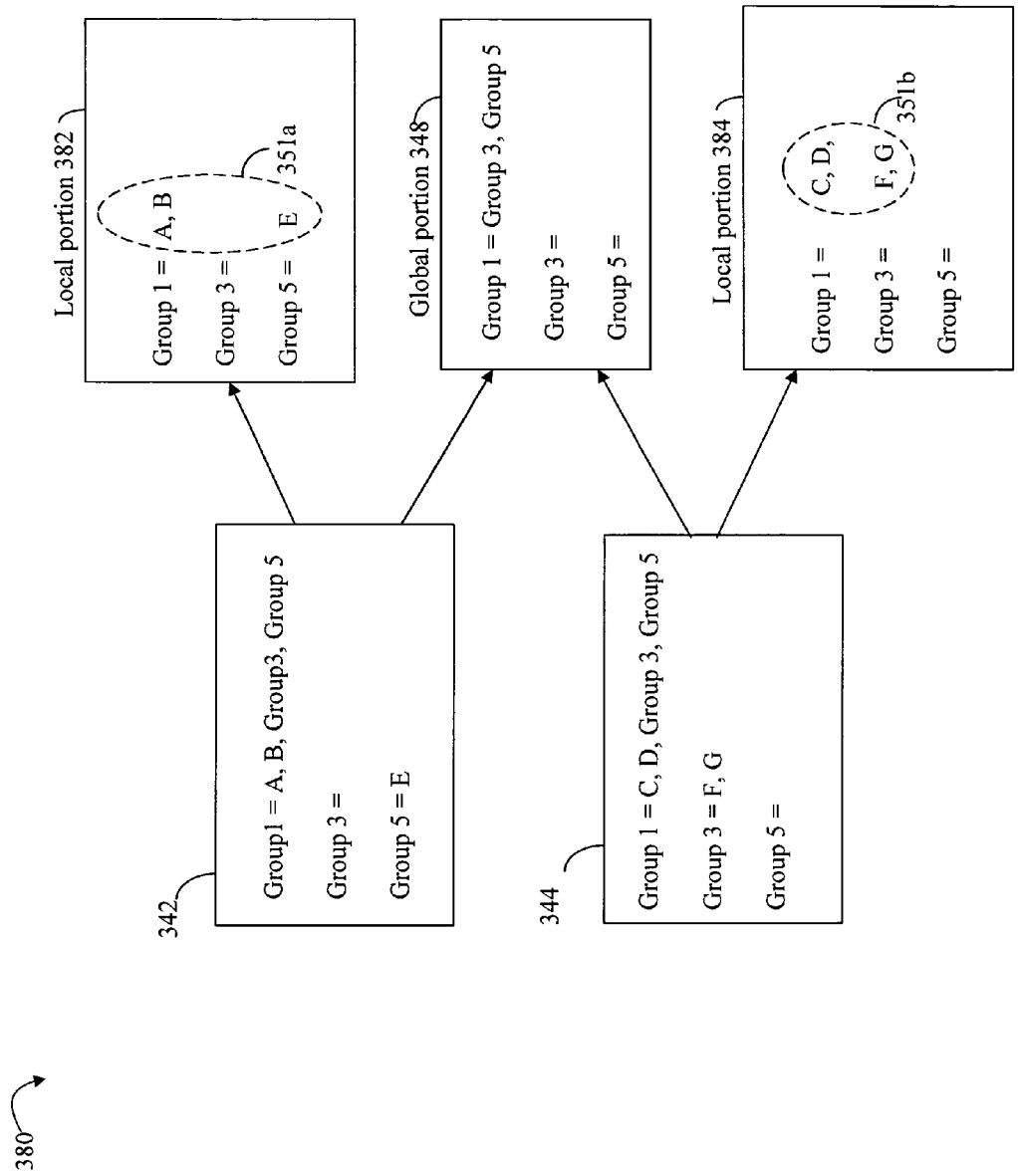

Referring now to FIG. 4D, shown is an example 380 illustrating another view or representation of the group data as stored on each of the nodes 342 and 344. Each of the nodes 342 and 344 may store the global portion and the node's respective local portion in a single data container, as represented in FIG. 4B. Alternatively, as illustrated in FIG. 4D, an embodiment may have each of the nodes store the global portion in a data area separate from the node's local portion. Node 342 may, for example, store the global portion of group data 348 into a first data container and the node's unique local portion of group data 382 into a second data container. Node 344 may similarly store the global portion of group data 348 into a first data container and the node's unique local portion of group data 384 into a second data container.

It should be noted that the representations in FIGS. 4B and 4D illustrate two ways in which a node may store its group data. An embodiment utilizing the representation in FIG. 4D in which each node may store the global portion and its local portion in separate data containers may use any one of a variety of different techniques in connection with providing a persistent copy or replication of the global portion on each node.

In an embodiment utilizing the foregoing distribution of group data among nodes, each node's group service 330 may be queried using requests, such as using an API. In one embodiment, each node's group service 330 may include support for requests for the following information:

1) Enumerate all groups that exist—returns a list of all groups defined

2) For a given group, return all groups that are included within that group—input parameter specifies a group and the service returns a list of groups 3) For a given group, return all objects defined at the node being queried belonging to that given group—input parameter specifies a group and the service returns a list of objects which are both members of the group and defined at the node being queried.

4) For a given object, return the groups of which this object is a member—input parameter specifies an object and the service returns a list of groups. Note that if the object is not defined at the node being queried, the service returns null or an indicator of "no groups". If the object is defined at the node being queried but not a member of any group, null or an indicator of "no groups" is also returned.

Each of the foregoing 4 items may be associated with a different request type as may be indicated in a request received by group service 330.

It should be noted that 3) and 4) above made with respect to only the receiving node may be referred to as a local inquiry. An embodiment of the group service 330 may also provide versions of 3) and 4) for global request inquiries. As with the object access API with global specification, the group service of a current node may perform the inquiry with respect to the current node and other nodes (e.g., all other nodes included in the subtree defined with the current node as the root) utilizing the request forwarding technique as described herein. In an embodiment of the group service including versions of 3) and 4) for both local and global with request forwarding, a flag may be used to indicate the appropriate inquiry or request scope as local or global with request forwarding. As an example, a request may be received at a node's group service 330 to list all objects included in group G1. Such a request may be made, for example, by the GUI 110 when a user makes a selection to view all objects in group G1. The request specifies that this inquiry or request is made with respect to all nodes in the domain for global request inquiry. The originating node receiving the request from the GUI inquires of its own group service 330 for any locally defined objects that are members of G1. The originating node also sends the request to all other nodes in the domain using the request forwarding technique. Using the request forwarding technique, each other node inquires of its own group service for any locally defined objects that are members of G1, forwards the request on to any descendant nodes as indicated in the dynamic communication tree, consolidates information received from its descendant nodes with its own local information, and returns the consolidated information to its parent node. When the originating node receives responses, it also consolidates the received information with its own local information regarding G1 and returns this consolidated information to the GUI.

As just described, the group service 330 at each node may be utilized in connection with returning information about group membership, hierarchy, and definitions. A node's object access API 326 may also use the group service 330 in connection with processing its received requests such as, for example, to gather information about a group-related metric or property of group members (e.g., based on properties of individual objects included in each group). In other words, the functionality included in the group service 330 may be used as a separate service, for example, by the GUI 110, as well as used or leveraged by API 326.

As described herein, distributed information roll-up techniques may be used by the API 326 in connection with obtaining or "rolling up" information to determine a collective group-related metric or property. As part of the processing performed at a node which is requested to return metric related information, each individual node asks its own group service for all objects of that node that are in the group in question. In other words, a node receives a request for metric-related information about a particular group. The request may come from GUI 110. In response, the node may utilize the node's own group service and object access API in determining the metric-related information for the group. Depending on the particular operation being performed on the management system 16, a node's group service may be utilized in a variety of different ways. Consider the following example using request forwarding. The GUI 110 of FIG. 2 may issue one or more requests for metrics to be displayed in a window for a given group because the user has navigated to that group. In this example, the group entity is represented as a folder in the display although other representations are possible. The user selects the group using an input device such as by double-clicking with a mouse on the group's corresponding folder. In response to the selection, the GUI requests rolled up metrics information for that group from a central collector node as may be processed by the central node's object access API. The object access API of the central collector node sends a request, such as using request forwarding, to all nodes in the domain asking for "per node rolled up" metrics for the group. The object access API of the central collector node issues a request to its own group service to determine if any objects are defined for the group at the central collector node. The central collector node's object access API then utilizes the services of its local object database manager to obtain information about each object defined at the local collector node for the requested group. Additionally, the other nodes receive and process the request as originating from the central collector node. In response, each node uses its own group service and other components to determine the node's rolled up metric information, consolidate its own metric information with any information returned from descendant nodes, and then returns the consolidated metric information to its parent. The central collector node receives all of the individual node information and computes the overall rolled-up metric information requested. The information is returned to the GUI which displays the metric information on an output device such as by displaying the metric in a location near the selected folder for the group.

Note that the group service at each node may handle processing associated with nested groups. The group service at a node performs processing to handle processing for nested groups at the local node level. For example, consider a request to return all members of a group such as group 1. Each node's group service may determine its contribution to group 1 as follows:

1) determining which of its own local objects are in group 1. This may be performed utilizing the group service of the node to return all objects locally defined at the node for group 1 (e.g., using the local portion of the group information at the node); and 2) determining all groups within group 1. This may be performed utilizing the group service of the node to return all groups defined within group 1 (e.g., using the global portion of the group information stored at the node).

Subsequently, for each group returned in 2), both steps 1) and 2) above are repeated until no further groups are returned.

If the group service of a node is being used in connection with a metric rollup, then a further inquiry may be made for all the locally defined objects in the group. For each object that is a member of the group, the object access API and/or the object database manager of the node may be used to obtain the information needed about each object in the group in accordance with the requested metric.

Figure 5:
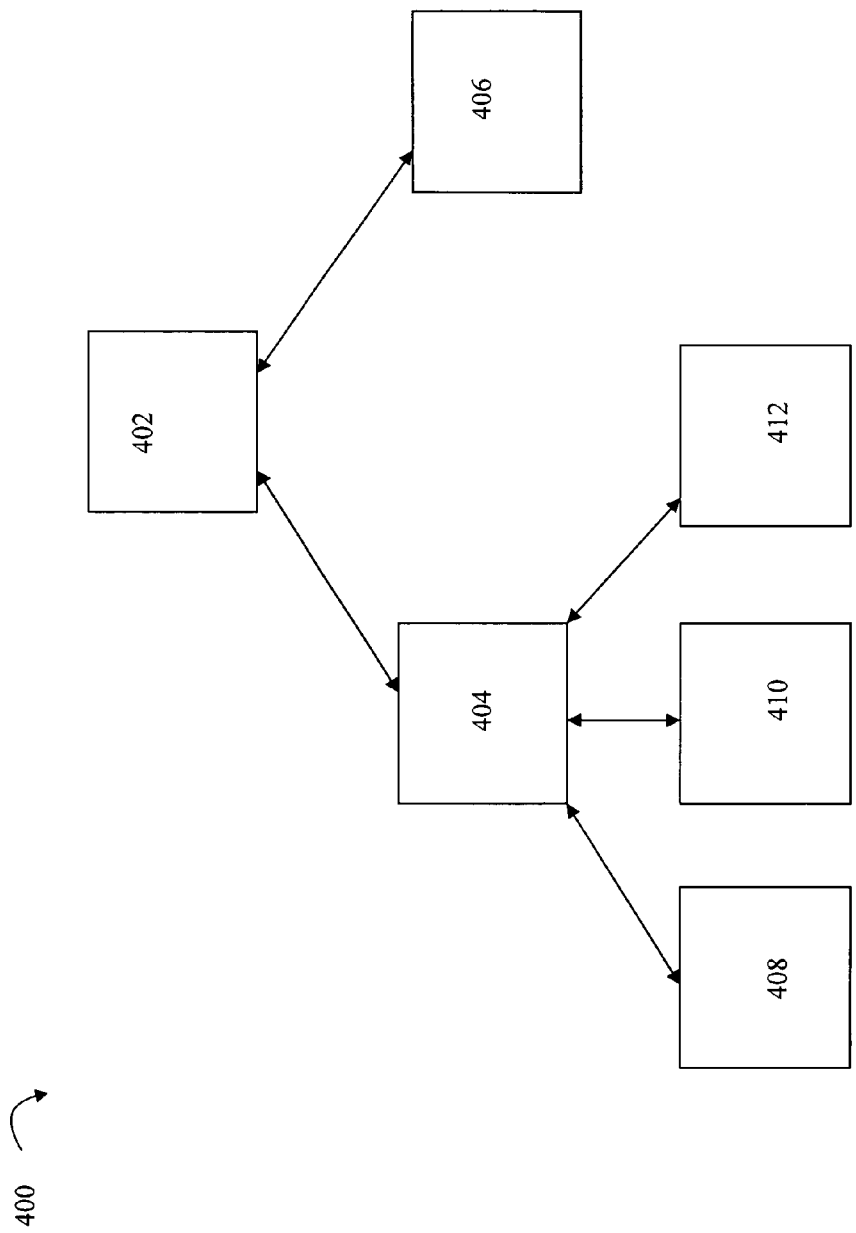
FIGS. 5 and 6 are example representations of nodes and how information is communicated therebetween using the techniques described herein.

Referring now to FIG. 5, shown is an example 400 illustrating a dynamic communication tree in more detail as may be used in connection with the request forwarding technique described elsewhere herein for distributed information roll-up. In the example 400, the root node 402 corresponds to the central collector node which forwards requests for information down the tree as described herein. For example, node 402 requests that node 404 report any local information and also request information from nodes 408, 410 and 412. Node 404 then consolidates its local information along with any information forwarded from nodes 408, 410 and 412 and reports this consolidated information to node 402.

Figure 6:
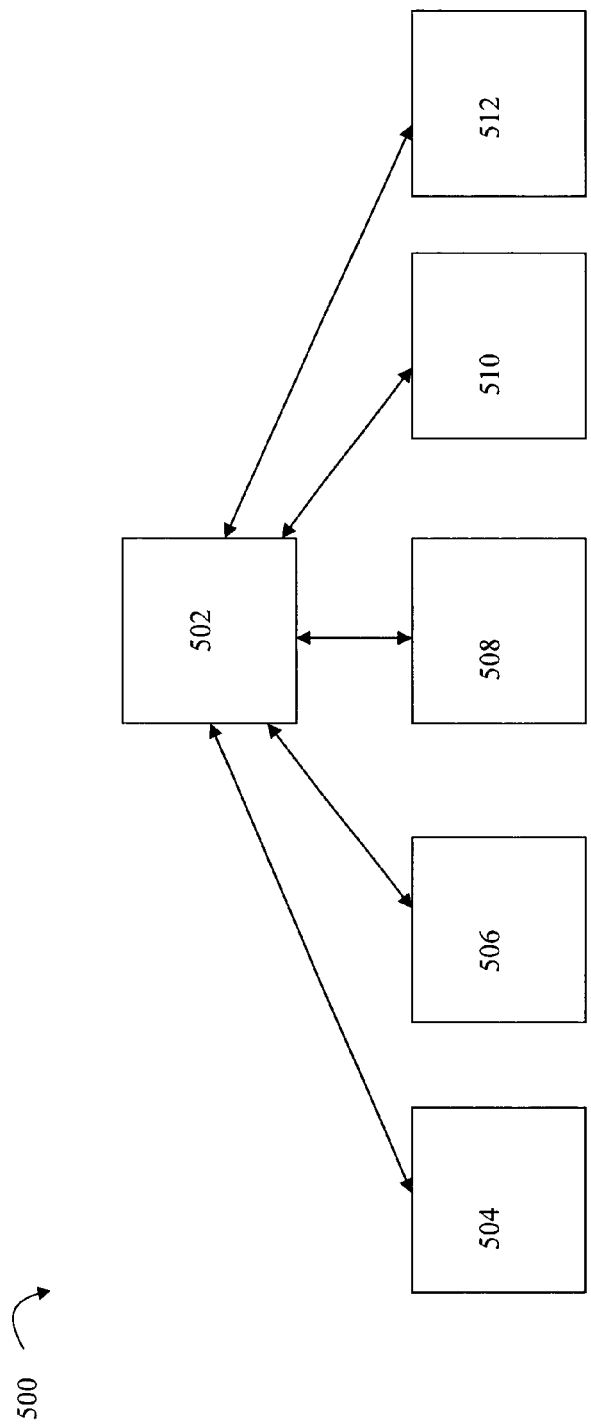

Referring now to FIG. 6, shown is an example 500 illustrating reporting and distributed information roll-up. In this example, the node 502 is the central collector node and all nodes in the domain do not have connectivity to each other node in the domain. However, the selected central collector node 502 has connectivity to all other nodes (504, 506, 508, 510 and 512) in the domain and directly communicates with each one of these other nodes to request and obtain the information on particular objects.

It should be noted that in the techniques illustrated in connection with FIG. 6 may be used by both the group service and object access API at each node in the event that the request forwarding technique cannot be utilized as a result of all nodes in the domain not having connectivity to all other nodes in the domain.

Figure 7:
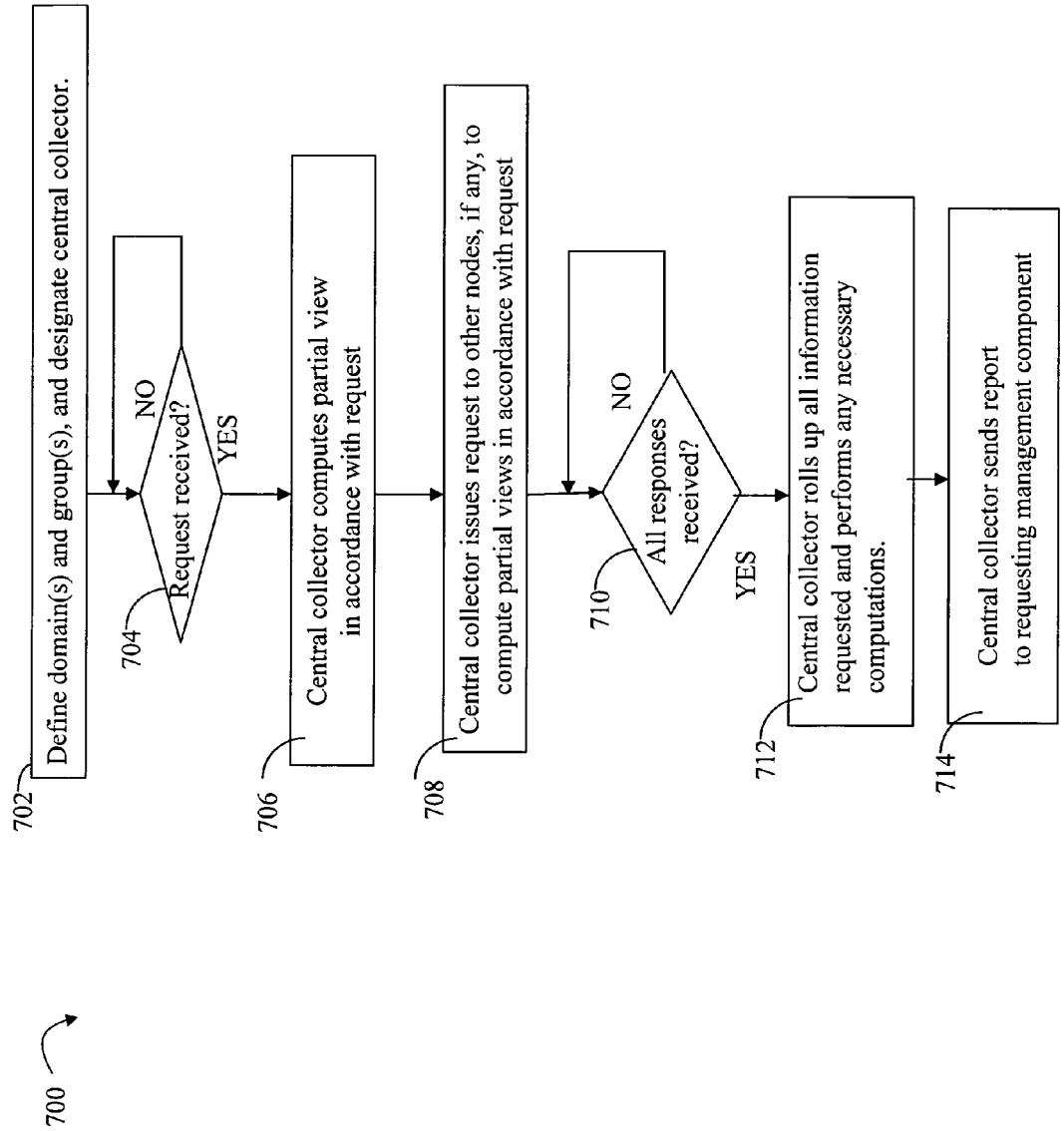
FIGS. 7, 8A, and 8B are flowcharts of processing steps that may be performed in connection with the techniques described herein.

Referring now to FIG. 7, shown is a flowchart 700 of processing steps that may be performed in an embodiment in connection with the techniques described herein for distributed information roll-up regarding a group-related property or metric. Flowchart 700 summarizes processing described in previous paragraphs. At step 702, one or more domains and groups are defined. A central collector node is also designated. Step 702 may be performed at anytime prior to performing the remaining steps of flowchart 700. Processing of step 702 may be performed as part of initialization or setup by a data storage system manager. At step 704, a determination is made by the object access API of the central collector as to whether information on objects included in one or more groups has been requested. If not, control proceeds back to step 704 until such a request is received and control proceeds to step 706. At step 706, the central collector determines its partial view in accordance with the received request. This may include using the central collector's group service and other components as described elsewhere herein. Step 706 may also include refreshing the object database as may also be indicated in the request. At step 708, the central collector issues a request to other nodes to compute their partial views in accordance with the request. In the event the request forwarding technique is used, the central collector interacts with nodes in the next level of the dynamic communication tree heading downward from the root to the leaf nodes as illustrated, for example, in FIG. 5. Each of these nodes in the next level determines its partial view in accordance with each node's own local object information, receives the other information from any of its descending nodes in the tree, consolidates the received information with the node's partial view, and returns the consolidated information to the collector node. In connection with obtaining the information from descending nodes, further requests may be issued to other nodes located in a downward position of the tree with respect to the current node. The foregoing issuing of requests and information consolidation may be repetitively performed for nodes at each level of the tree as in connection with the request forwarding technique. In an alternate embodiment described herein, the central collector node may directly issue requests to each node in the domain. The processing performed at each node receiving a request for group metric or property information is described in more detail in connection with FIG. 8A. At step 710, a determination is made by the central collector as to whether all expected consolidated information in response to all requests from other nodes has been received. The central collector may generally expect return information from each node to which it sends a request at step 708. If responses to all the requests have not yet been received, control proceeds back to step 710 to wait until such time. Once all expected responses are received, control proceeds to step 712 where the central collector rolls up all information received in combination with the collector's partial view and also performs any necessary computations. Such computations may include, for example, further evaluating or refining the data received in accordance with the particular request. The API 326 of the central collector node may obtain information about any objects from the central collector node's object database manager. At step 714, the central collector sends the report to the requesting management system component, such as the GUI.

It should be noted that an embodiment performing the processing of 700 may also include other steps such as, for example, to handle a timeout and/or error condition for step 710 in the event that all nodes do not report back within a predetermined time period.

Figure 8A:
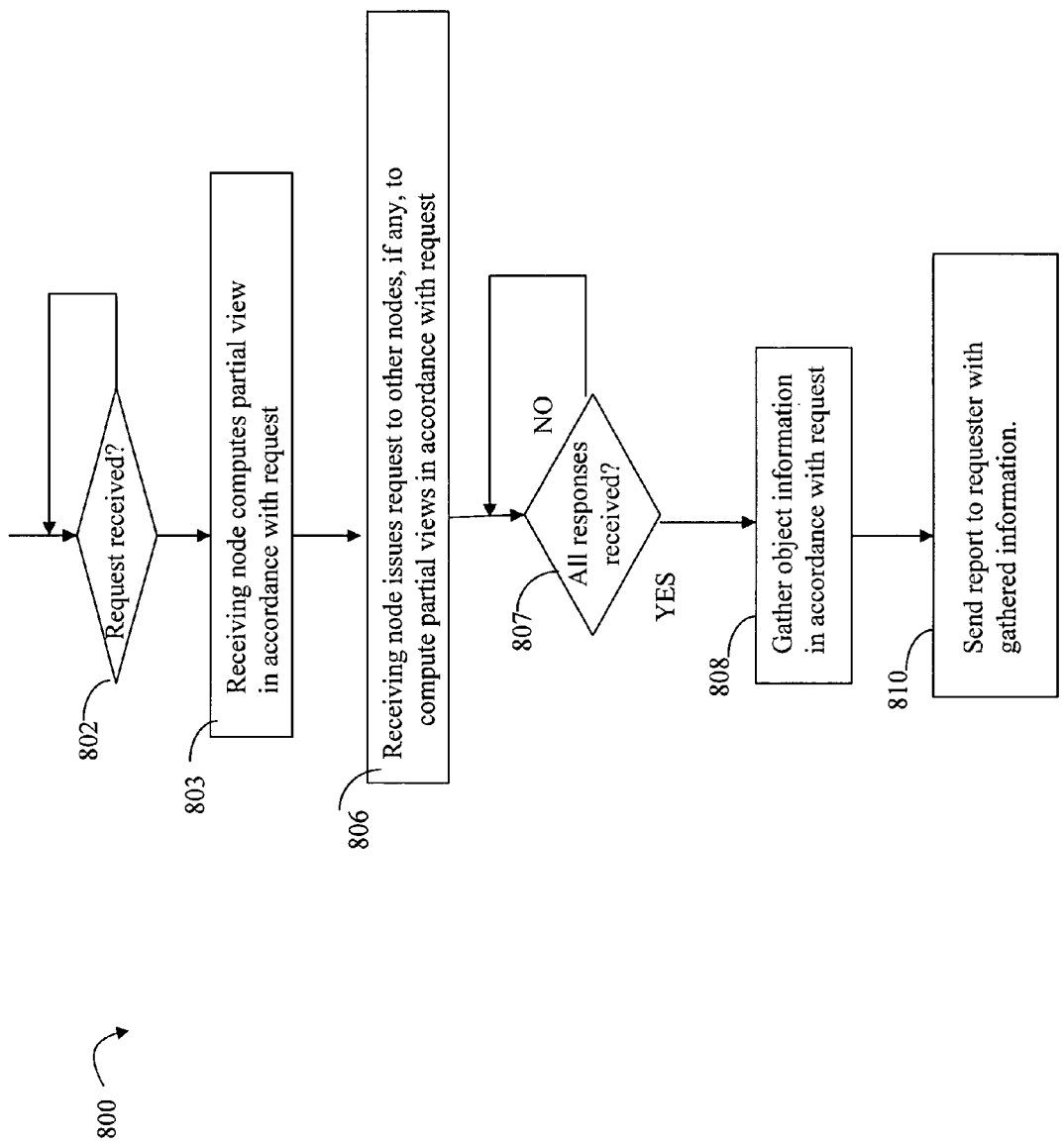

Referring now to FIG. 8A, shown is a flowchart 800 of processing steps that may be performed at each node in a domain in connection with servicing a request for information about a group-related property or metric. Such requests may be received at each node in connection with the distributed information roll-up techniques described herein. It should be noted that steps 802, 803, 806, 807, 808 and 810, as may be performed by a receiving node, are respectively analogous to steps 704, 706, 708, 710, 712, and 714 of flowchart 700, as may be performed by an embodiment of the central collector node. At step 802, a determination is made as to whether a request is received at the node. Processing continues to wait at step 802 until a request is received at the node and step 802 evaluates to yes. The request may be received by a node's object access API 326. At step 803, the receiving node computes its partial view in accordance with the request. At step 806, the receiving node issues the request to other nodes, if any, to compute their partial views in accordance with the request. At step 807, a determination is made as to whether all expected responses have been received. If responses to all the requests have not yet been received, control proceeds back to step 807 to wait until such time. At step 808, object information is gathered in accordance with the request. Step 808 may include gathering information from the node's local object database as well as obtaining information from any descendant nodes if the call forwarding technique is used as described elsewhere herein. The API 326 may obtain information about any objects from the node's object database manager. At step 810, a report is sent to the requesting node with the request information. The requested information may include gathered information from the node's local object database and any information obtained from other nodes such as, for example, descendant nodes in an embodiment utilizing the call forwarding technique.

Figure 8B:
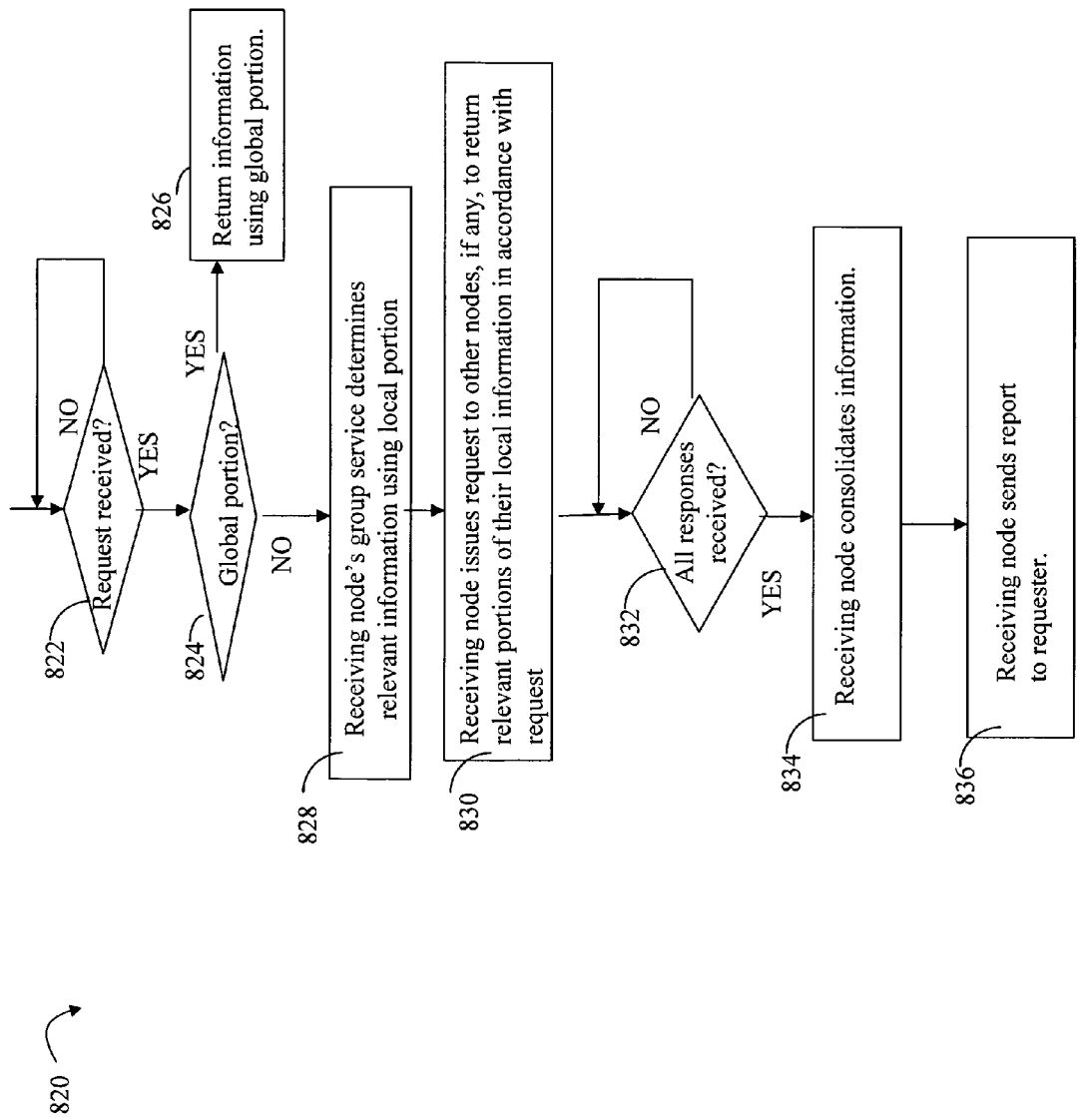

What will now be described in connection with FIG. 8B is a flowchart of processing steps as may be performed in an embodiment in connection with providing group services.

Referring now to FIG. 8B, shown is a flowchart of processing steps that may be performed by a group service of a node. At step 822, a determination is made as to whether a request is received. If not, the group service continues at step 822 until such a request is received for processing. Such a request may come from the GUI in connection with performing an operation as well as another node gathering information from other nodes. At step 824, a determination is made as to whether the request can be serviced using just the global portion of group data. Such requests do not require use of any local portions from the receiving or other nodes. Such requests may be, for example, for a list of all existing or defined groups in a domain, or for a given group, all other groups contained in the given group. If step 824 evaluates to yes, control proceeds to step 826 to return requested information in accordance with the global portion. If step 824 evaluates to no, control proceeds to step 828 where the receiving node's group service determines the relevant information in accordance with the request using the local portion of the current node. At step 830, requests are issued to other nodes, if any, to return relevant portions of their local information in accordance with the request. In an embodiment using the request forwarding technique as described elsewhere herein, the receiving node forwards the request to the appropriate nodes in accordance with the dynamic communication tree. If the receiving node is the node originally receiving the request from the GUI in an embodiment in which nodes of the domain do not have sufficient connectivity to use the request forwarding technique, the receiving node may directly communicate with each other node in the domain to request the information. At step 832, a determination is made as to whether all responses have been received. If not, processing continues to wait until all responses are received and step 832 evaluates to yes. Control proceeds to step 834 where the receiving node performs consolidation of its own relevant local information, if any, with any other information received. At step 836, the receiving node sends the consolidated information to the requester. If the receiving node has received the request directly from the GUI, the receiving node returns the information to the GUI. If the receiving node's group service received the request from another node, the receiving node returns the information to the other requesting node.

Figure 9:
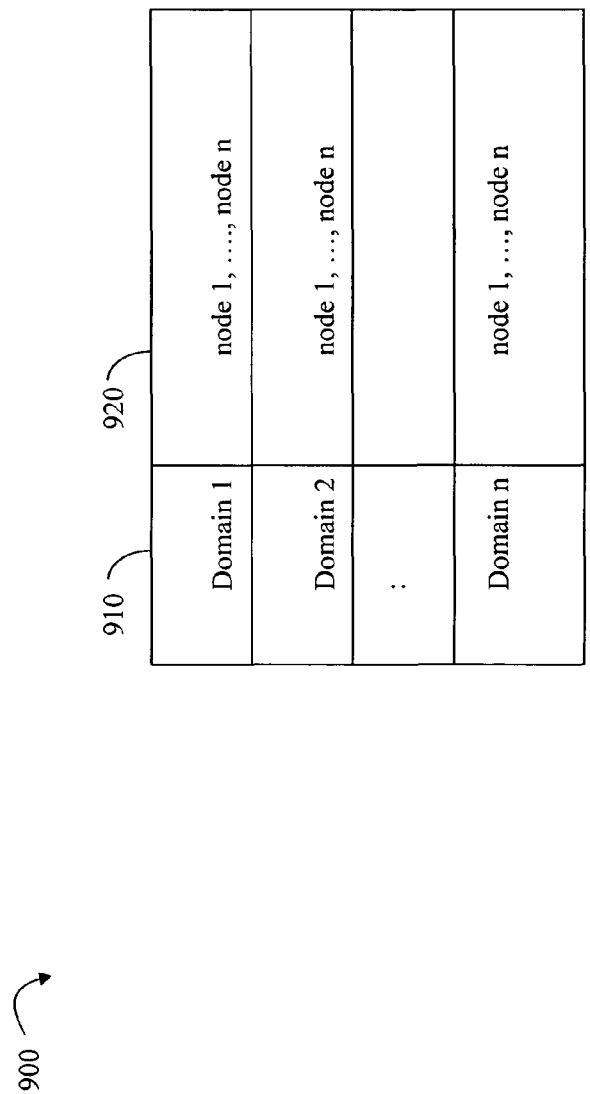
FIGS. 9, 10, 11, 12, and 13 are example representations of data structures that may be used in connection with the techniques described herein.

Referring now to FIG. 9, shown is an example 900 of domain information as may be utilized in connection with element 118 of FIG. 2. The table 900 may include an entry for each domain. The domain identifier is indicated in column 910 with the particular nodes for the domain included in column 920 of the same row. The example 910 is a representation of a domain information as may be included in 118 for use with the GUI and other components of the system 16.

Figure 10:
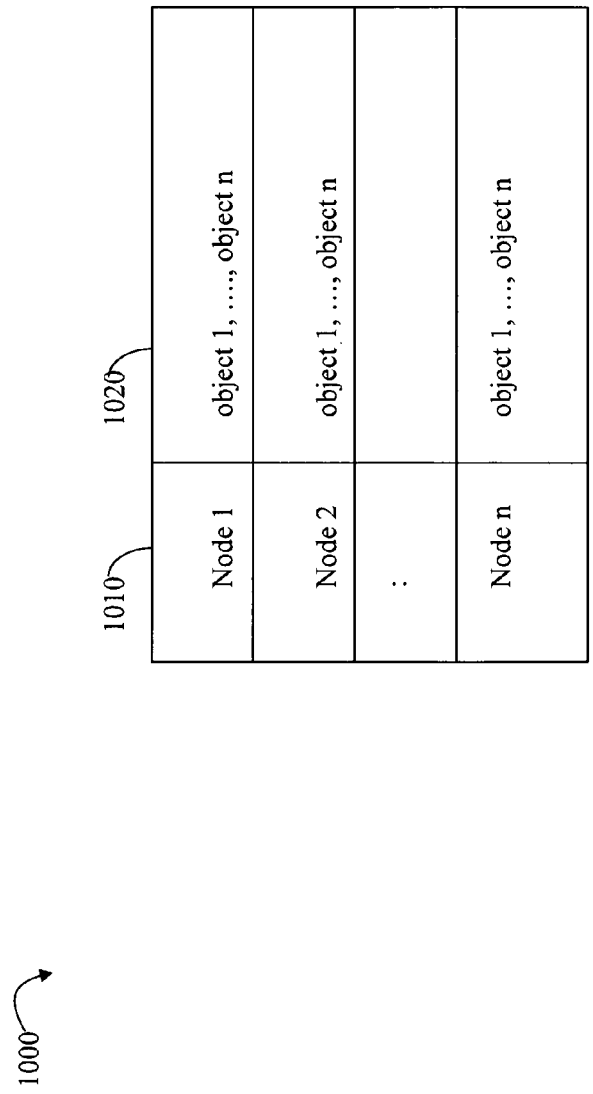

Referring now to FIG. 10, shown is an example 1000 of objects that may be defined or included for each node in the domain. The table 1000 includes an entry for each node in the domain. The node identifier is indicated in column 1010 with the particular objects for the node included in column 1020 of the same row. The information in 1000 may be utilized in connection with element 116a of FIG. 2. Such information may be used, for example, when displaying information to a user in connection with selecting objects when defining one or more groups. It should be noted that an embodiment may temporarily construct the table 1000 during the process of defining groups. The table 1000 may be constructed at the time the user issues commands in connection with defining groups. Accordingly, requests may be issued as needed to obtain information as to what objects are defined for each node when a user begins group definition processing. Recall, as described elsewhere herein, the element 16a may include a subset of information about a domain as needed in accordance with GUI processing and user selections.

Figure 11:
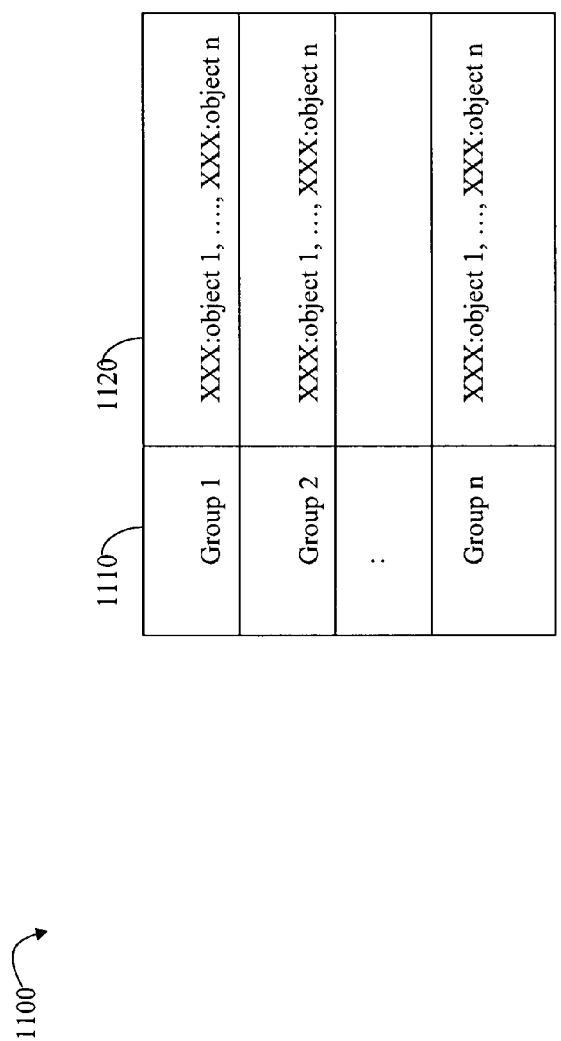

Referring now to FIG. 11, shown is an example 1100 of a table of group information. The table 1100 includes an entry for each group defined in the domain. The group identifier is indicated in column 1110 with the particular objects for the group included in column 1120 of the same row. The information in 1100 may be utilized in connection with element 130a of FIG. 2. It should be noted that each object in 1120 includes a prefix "XXX:" denoting an object indicator. The object indicator is the information needed to uniquely identify the object instance for the particular group. The object indicator allows for proper determination as to which node includes the particular object instance. The object indicator may vary with each embodiment. It should be noted that in an embodiment allowing a group definition to include another group, a group identifier may appear in the column 1120 along with any objects. Such nested groups may be expanded when a request is made in connection with a group. For example, if a first group includes objects and a second group, the particular objects associated with the second group may be determined when a user selects the second group for further expansion via the GUI.

The table included in the example 1100 may be included in 130a and used for storing group information for one or more groups used in connection with the GUI. In this instance, as described elsewhere herein, the table includes a subset of group information. An embodiment may also use a representation of the table 1100 in connection with storing a node's local portion of group data as illustrated, for example, in connection with FIGS. 4B-4D. Note that in this instance, the indicator "XXX" may be omitted since the objects included in the local portion are only defined at each node.

Figure 12:
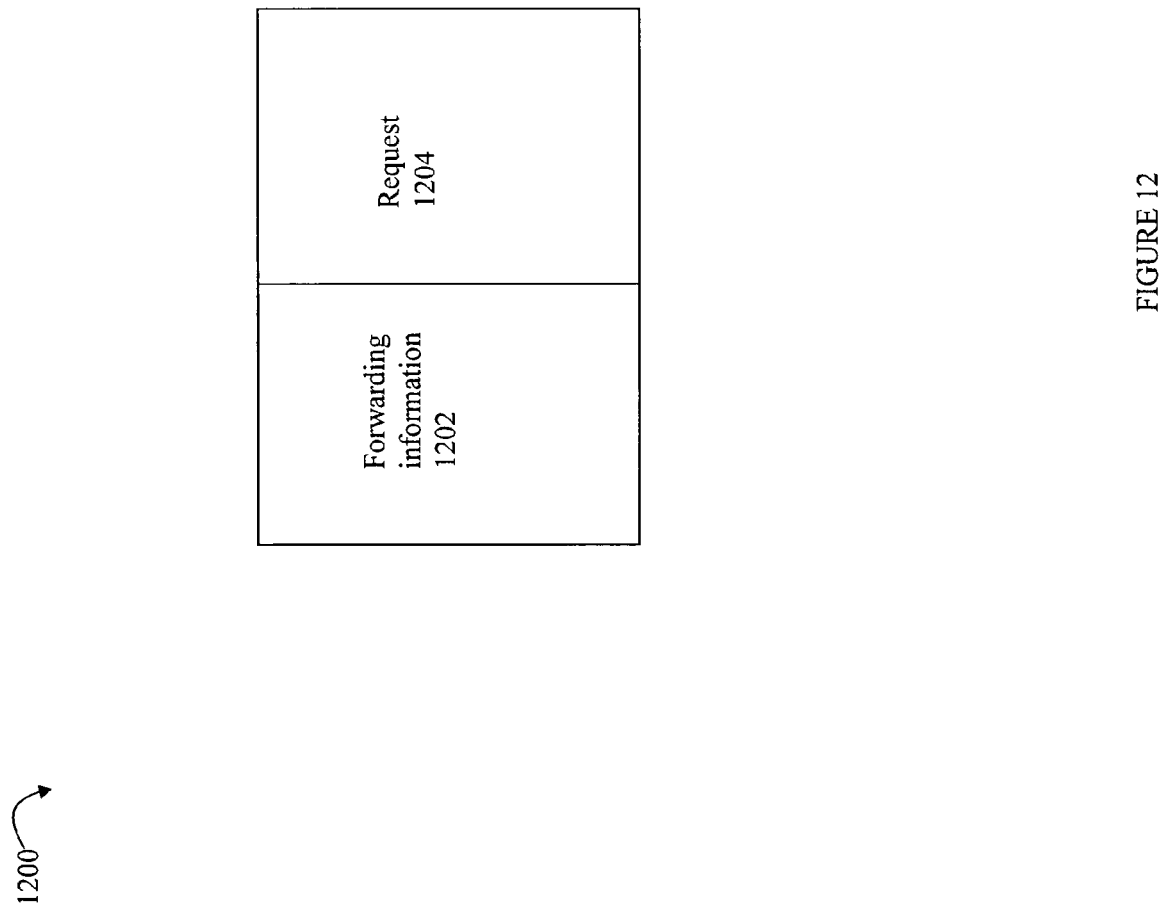

Referring now to FIG. 12, shown is an example 1200 illustrating the message as may be forwarded from one node to another node. Such a message may be forwarded from the central collector to other nodes, as well as a first parent node requesting information from one or more of its child nodes in connection with the request forwarding technique as may be utilized in an embodiment. As described in U.S. patent application Ser. No. 09/877,862, which is incorporated by reference herein, the message may include forwarding information 1202 and a request portion 1204. The request portion 1204 may describe the particular information being requested. In an embodiment using the request forwarding technique, the forwarding information 1201 may be customized for each node and the other nodes from which further requests are to be made. In other words, the customized forwarding information 1202 may specify the addresses of all the nodes in an instance of the tree as illustrated in FIG. 5 to whom the request is to be forwarded. The request may identify, for example, the particular property, group, and/or objects for which information is requested.

It should be noted that the foregoing request may be used in connection with requests made to group services as well as object access APIs of each node. Such a request may be sent between nodes as well as between the GUI and a node.

Figure 13:
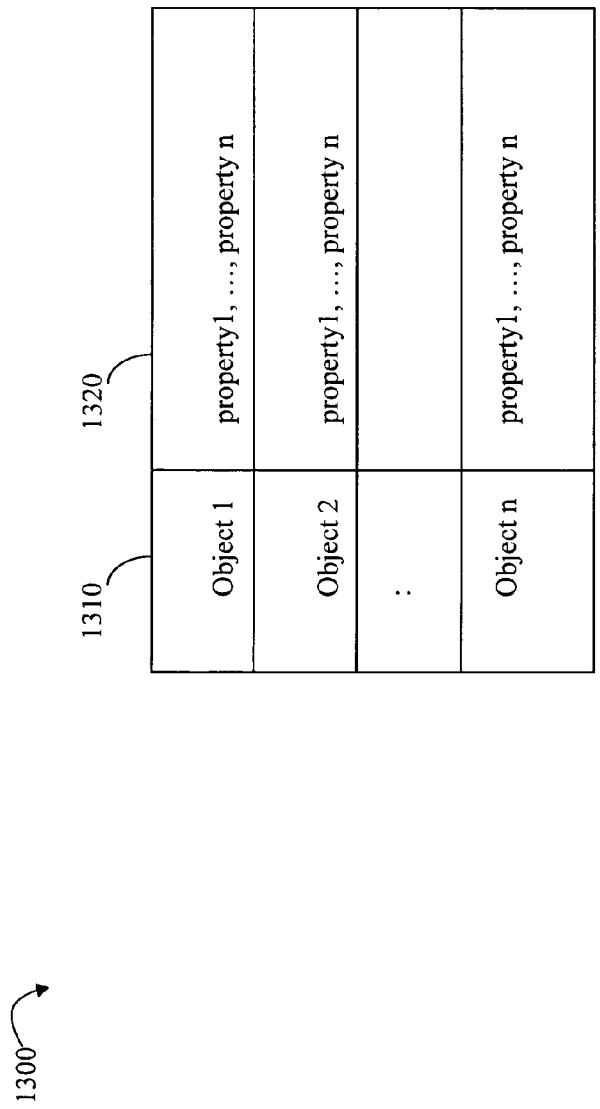

Referring now to FIG. 13, shown is an example of table of object information. The table 1300 includes an entry for each object defined in a node. The table 1300 is a representation of the information on objects, as may be stored in the object database of each node. The object identifier is indicated in column 1310 with the particular properties for the object included in column 1320 of the same row.

Previously described in connection with FIG. 2, multiple domains are illustrated. However, the techniques described herein in connection with FIG. 2 are illustrated with respect to nodes in a single domain and with a collector node included as a member of the single domain. It should be noted that a collector node may be a node outside of the domain as well. Furthermore, the techniques described herein may be performed for multiple domains as well as a single domain.

Figure 14:
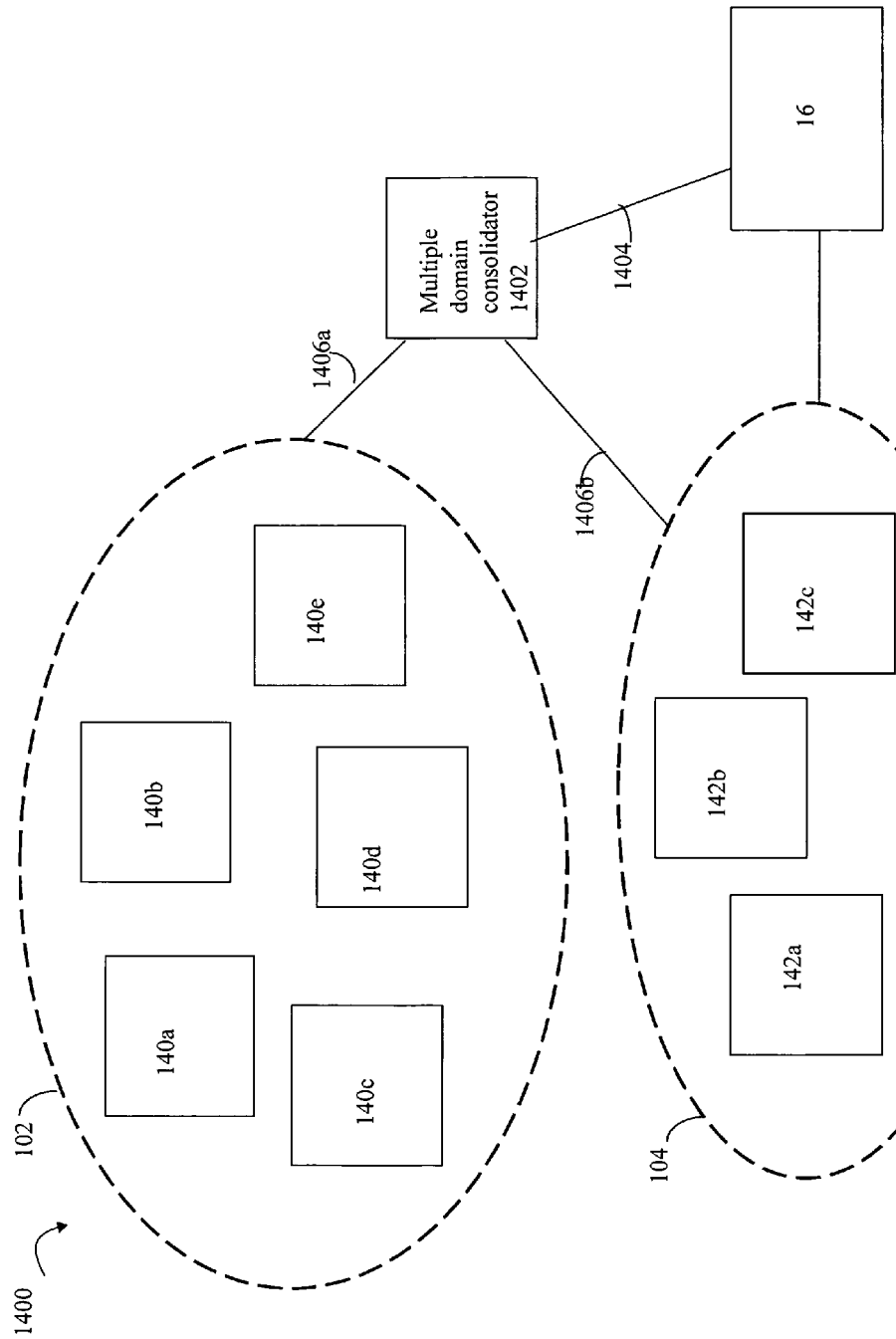
FIG. 14 is an example of another embodiment of components of FIG. 1 in more detail as may be used in connection with techniques described herein.

Referring now to FIG. 14, shown is an example of another embodiment using the techniques described herein with multiple domains. The techniques described herein may be performed with respect to one or more domains. The example 1400 includes the two domains 102 and 104 as illustrated in FIG. 2 although more than two domains may be included. The example 1400 includes a multiple domain consolidator 1402 which communicates with the management system 16 over connection 1404, and with each of the domains 102 and 104, respectively, over connections 1406a and 1406b. Each of the connections used to facilitate communications between the various components of FIG. 14 represent a connection established using any one of a variety of different communication connections, such as the network 20 previously illustrated in FIG. 2. However, additional elements, such as the network 20, have been omitted for the sake of simplicity of illustration.

In connection with FIG. 2 and other figures, the management system 16 is described as communicating with a collector node in a single domain for requests for both distributed information rollup regarding a metric as well as utilizing group services. In connection with FIG. 14, when a request by the management system 16 is performed with respect to multiple domains, a designated multiple domain consolidator 1402 may communicate with the management system 16. The multiple domain consolidator 1402 may subsequently communicate with a node in each of the domains to perform the requested operation. In other words, the multiple domain consolidator 1402 communicates with a first node in domain 102 which performs the techniques as described herein for a single domain in accordance with the request. Similarly, a second node in the domain 104 performs the techniques for the single domain 104. When each of the first and second nodes has aggregated information in accordance with the request for each of the domains, the first and second nodes report the information to the multiple domain consolidator 1402 which further aggregates the information with respect to the first and second domains. The multiple domain consolidator 1402 then reports this information to the management system 16. The multiple domain consolidator 1402 may be any entity having the necessary connectivity to each of the domains and the system 16 and which also has its own processor able to execute code in connection with servicing a request. The consolidator 1402 may be, for example, a data storage system, a personal computer and, the like. In one embodiment, a single consolidator may function as a consolidator for all domains.

The particular node selected in each domain by the multiple domain consolidator 1402 may be any node having the necessary connectivity to other nodes in the domain. The node in a domain may be selected using any one of a variety of different techniques in an embodiment such as, for example, random selection, in accordance with one or more heuristics related to the particular load or performance of a node, and the like. For example, if request forwarding is used, the node in the first domain selected by the consolidator 1402 may be any node in the domain since all nodes have connectivity to all other nodes in the domain. In the event the alternate technique (e.g., illustrated in FIG. 6) is used when not all nodes have connectivity to all other nodes, the node selected may have connectivity to all other nodes.

It should be noted that the configuration of FIG. 14 may also be used in connection with a single domain representing an example in which the consolidator or collector node for a single domain is not included within that single domain.

Although the techniques described herein for distributed information roll-up as performed by the object access API are illustrated in connection with rolling up metric information about groups, it will be appreciated by those skilled in the art that the techniques described herein may be more generally applied for use with other tasks and other types of information. The distributed techniques described herein may be performed in connection with determining an overall product or result which is decomposed into multiple partial products or results. Such techniques may be used, for example, in connection with determining information, such as a metric or other property, about a particular object when it is unknown which node or group includes the object. As another example, the techniques described herein may be used in connection with determining which objects or groups meet certain criteria. The collector node may return a list of the objects or groups meeting such criteria. As yet another example, a boolean inquiry can be made as to whether one or more groups of objects or one or more objects meet certain criteria, such as have a certain property. A boolean result may be determined by the collector node in accordance with the collected information and/or any computations.

It should be noted that in one embodiment, communications between nodes of the domain and between the management system and nodes in the domain may utilize the CIM (Common Information Management) protocol over connections utilizing TCP/IP. The requests and responses communicated therebetween may be written in XML (Extensible Mark-up Language). It will be appreciated by those skilled in the art that other protocols, formats and languages may be used in connection with implementation of the techniques described herein.

In one embodiment using the techniques described herein, a node may belong to at most a single domain (e.g., the result of the set intersection operation performed over all defined domains is the empty set), and objects may belong to one or more groups (e.g., the result of the set intersection operation performed over all defined groups may be non-null, or something other than the empty set, in accordance with existing group definitions). An embodiment may implement different restrictions and rules regarding group membership. For example, in one embodiment, members of a group may belong to different domains Described herein are techniques for distributed information roll-up using the object access API and, as needed, group service of each node. In connection with determining metric or other information about objects, each node computes or rolls-up its local contribution for those objects defined at each node. Additionally, if request forwarding is used, each node further requests and rolls up information regarding its descendant nodes as determined using the dynamic communication tree of nodes.

Also described herein is a group service. In the event that the information requested about objects, such as metrics or other properties about objects, is for a group of objects, the group service at each node may be used in connection with determining which objects for a requested group are defined at each node. Each node may then determine its local contribution to the requested metric for the locally defined objects included in the requested group.

The group service may also be used for requests about groups membership and hierarchy. Although the group service may be used in determining or rolling up information for a requested group metric, the group service may be used independently of a request pertaining to a metric or other request for information based on properties of one or more objects. The group service request may be categorized based on whether the request can be serviced using only global information. Otherwise, the node's local portion of group information or group data may be used, alone or in combination with the global information, to service the request. A component, such as the GUI of management system 16, may make a request for just group data utilizing the group service of one or more nodes. The group service of a receiving node may also utilize request forwarding (e.g., as illustrated in FIG. 5) or an alternative technique (e.g., as illustrated in FIG. 6) in connection with obtaining the requested group information. Each node stores a global portion of group data regarding group hierarchy and defined groups. The global portion in the embodiment herein is persistently replicated at each node in a domain. Additionally, each node stores a local portion of group data regarding which objects defined locally at that node are included in each group. Each node locally stores information, such as properties, about each of the individual objects defined at that local node, as may be accessed in connection with the object database manager, object database, and object access API at each node.

The foregoing provides for distribution of the local portions of group data and distribution of the object data at the node level where the object is defined. Using the foregoing provides a distributed approach which is scalable for use with a varying number of nodes, domains, and groups. Only the global group data portion is replicated at each node. Use of techniques, such as the request forwarding, provides for discovery and collection of the distributed information.

It should be noted that although an embodiment is described herein in which each node includes the group service along with other components, such as the object access API, object database manager, and object database, an embodiment may utilize the group service and techniques in connection therewith out using the object access API, object database manager, and object database as described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of distributing information about one or more groups of objects in a plurality of nodes comprising:
storing a same first portion of group information on each of said plurality of nodes, said plurality of nodes including at least one data storage system, said same first portion being replicated on each of said plurality of nodes and including information identifying defined groups of objects and associated group hierarchy information, said associated group hierarchy information including information indicating which of said one or more groups included in said defined groups of objects are included as members of others of said one or more groups, wherein when a first of said one or more groups is included as a member of a second of said one or more groups, all objects in said first group are members of said second group and wherein said same first portion includes names of defined groups; and
storing a second portion of group information on each of said plurality of nodes, said second portion stored on each of said plurality of nodes identifying which objects included in said one or more groups are defined at said each node.

2. The method of claim 1, wherein said second portion stored at each of said plurality of nodes varies in accordance with objects defined at said each node.

3. The method of claim 1, wherein each of the objects corresponds to a logical entity or a physical entity on one of the plurality of nodes.

4. The method of claim 1, wherein said one or more groups includes at least one group with objects from different nodes.

5. The method of claim 4, wherein said plurality of nodes corresponds to a domain of data storage systems.

6. A non-transitory computer readable storage medium comprising code stored thereon for distributing information about one or more groups of objects in a plurality of nodes, the computer readable medium comprising code stored thereon that:
    stores a same first portion of group information on each of said plurality of nodes, said plurality of nodes including at least one data storage system, said same first portion being replicated on each of said plurality of nodes and including information identifying defined groups of objects and associated group hierarchy information, said associated group hierarchy information including information indicating which of said one or more groups included in said defined groups of objects are included as members of others of said one or more groups, wherein when a first of said one or more groups is included as a member of a second of said one or more groups, all objects in said first group are members of said second group and wherein said same first portion includes names of defined groups; and
    stores a second portion of group information on each of said plurality of nodes, said second portion stored on each of said plurality of nodes identifying which objects included in said one or more groups are defined at said each node.

7. The non-transitory computer readable storage medium of claim 6, wherein said second portion stored at each of said plurality of nodes varies in accordance with objects defined at said each node.

8. The non-transitory computer readable storage medium of claim 6, wherein each of the objects corresponds to a logical entity or a physical entity on one of the plurality of nodes.

9. The non-transitory computer readable storage medium of claim 6, wherein said one or more groups includes at least one group with objects from different nodes.

* * * * *